United States Patent
Zhang

(10) Patent No.: US 9,706,546 B2
(45) Date of Patent: *Jul. 11, 2017

(54) PREAMBLES FOR SUB-1GHZ FREQUENCY BANDS

(71) Applicant: Marvell World Trade LTD., St. Michael (BB)

(72) Inventor: Hongyuan Zhang, Fremont, CA (US)

(73) Assignee: Marvell World Trade LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/658,609

(22) Filed: Mar. 16, 2015

(65) Prior Publication Data

US 2015/0189639 A1    Jul. 2, 2015

Related U.S. Application Data

(63) Continuation of application No. 13/464,467, filed on May 4, 2012, now Pat. No. 8,982,889.

(Continued)

(51) Int. Cl.
*H04L 12/28* (2006.01)
*H04W 72/04* (2009.01)
(Continued)

(52) U.S. Cl.
CPC ........... *H04W 72/044* (2013.01); *H04L 1/009* (2013.01); *H04L 1/0025* (2013.01);
(Continued)

(58) Field of Classification Search
CPC ........... H04L 29/0653; H04L 29/06095; H04L 49/3009; H04L 49/309; H04L 45/74;
(Continued)

(56) References Cited

U.S. PATENT DOCUMENTS 5,539,394 A   7/1996  Cato et al.
6,127,971 A   10/2000 Calderbank et al.
(Continued)

FOREIGN PATENT DOCUMENTS

CN   1890907 A    1/2007
CN   201045754 Y  4/2008
(Continued)

OTHER PUBLICATIONS

U.S. Appl. No. 12/730,651, filed Mar. 24, 2010, Zhang et al.

(Continued)

*Primary Examiner* — Brenda H Pham

(57) ABSTRACT

A preamble generator module generates a first preamble for a first packet, which is a single-user packet. The first preamble includes a first short training field, a first long training field, and a first signal field. The preamble generator module generates a second preamble for a second packet, which is a multi-user packet formatted as a multi-user packet or a single-user packet formatted as a multi-user packet. The second preamble is longer than the first preamble and includes a second short training field, a second long training field, and a second signal field. The first signal field and the second signal field conform to a Very High Throughput format specified in a wireless networking standard. A modulation module modulates the first signal field of the first preamble differently than the second signal field of the second preamble.

22 Claims, 14 Drawing Sheets

Related U.S. Application Data

(60) Provisional application No. 61/486,713, filed on May 16, 2011.

(51) Int. Cl.
*H04L 1/00* (2006.01)
*H04L 12/54* (2013.01)
*H04L 29/06* (2006.01)
*H04W 80/04* (2009.01)

(52) U.S. Cl.
CPC .......... *H04L 1/0028* (2013.01); *H04L 1/0033* (2013.01); *H04L 1/0039* (2013.01); *H04L 1/0079* (2013.01); *H04L 1/0083* (2013.01); *H04L 12/56* (2013.01); *H04L 29/0653* (2013.01); *H04L 69/22* (2013.01); *H04W 80/04* (2013.01)

(58) Field of Classification Search
CPC ... H04L 1/0025; H04L 1/0028; H04L 1/0033; H04L 1/0039; H04L 12/56; H04L 69/22; H04W 72/044; H04W 80/04
USPC .......... 370/389, 349, 392, 348, 474
See application file for complete search history.

(56) References Cited

U.S. PATENT DOCUMENTS

| | | |
|---|---|---|
| 6,272,117 B1 | 8/2001 | Choi et al. |
| 6,594,251 B1 | 7/2003 | Raissinia et al. |
| 6,760,388 B2 | 7/2004 | Ketchum et al. |
| 7,209,765 B1 | 4/2007 | Hayase et al. |
| 7,289,481 B2 | 10/2007 | Wax et al. |
| 7,339,949 B2 | 3/2008 | Suzuki et al. |
| 7,372,830 B2 | 5/2008 | Jung et al. |
| 7,394,787 B2 | 7/2008 | Lee |
| 7,411,898 B2 | 8/2008 | Erlich et al. |
| 7,436,903 B2 | 10/2008 | Sandhu et al. |
| 7,493,134 B2 | 2/2009 | Shinozaki |
| 7,515,541 B2 | 4/2009 | Sandhu |
| 7,532,681 B2 | 5/2009 | Takeda et al. |
| 7,599,332 B2 | 10/2009 | Zelst et al. |
| 7,636,328 B2 | 12/2009 | Teague et al. |
| 7,742,390 B2 | 6/2010 | Mujtaba |
| 7,855,993 B2 | 12/2010 | Mujtaba |
| 7,873,049 B2 | 1/2011 | Gaur et al. |
| 8,009,578 B2 | 8/2011 | Kishigami et al. |
| 8,126,090 B1 | 2/2012 | Nabar |
| 8,144,647 B2 | 3/2012 | Nabar et al. |
| 8,149,811 B2 | 4/2012 | Nabar et al. |
| 8,155,138 B2 | 4/2012 | van Nee |
| 8,194,771 B2 | 6/2012 | Hammerschmidt et al. |
| 8,238,316 B2 * | 8/2012 | Stacey .............. H04L 1/0046 370/338 |
| 8,289,869 B2 | 10/2012 | Sawai |
| 8,320,301 B2 | 11/2012 | Walton et al. |
| 8,331,419 B2 | 12/2012 | Zhang et al. |
| 8,339,978 B2 | 12/2012 | Sawai et al. |
| 8,437,440 B1 | 5/2013 | Zhang et al. |
| 8,462,643 B2 | 6/2013 | Walton et al. |
| 8,462,863 B1 | 6/2013 | Zhang et al. |
| 8,498,362 B2 | 7/2013 | Zhang et al. |
| 8,526,351 B2 | 9/2013 | Fischer et al. |
| 8,527,853 B2 | 9/2013 | Lakkis |
| 8,542,589 B2 | 9/2013 | Surineni et al. |
| 8,559,803 B2 | 10/2013 | Huang et al. |
| 8,588,144 B2 | 11/2013 | Nabar et al. |
| 8,599,803 B1 | 12/2013 | Zhang et al. |
| 8,619,907 B2 | 12/2013 | Mujtaba et al. |
| 8,718,191 B2 * | 5/2014 | Lee .............. H04L 27/0008 329/304 |
| 8,724,720 B2 | 5/2014 | Srinivasa et al. |
| 8,750,932 B2 | 6/2014 | Zeira et al. |
| 8,837,524 B2 | 9/2014 | Liu |
| 8,867,653 B2 | 10/2014 | Zhang et al. |
| 8,948,283 B2 | 2/2015 | Zhang |
| 8,958,436 B2 | 2/2015 | Nabar et al. |
| 8,982,889 B2 * | 3/2015 | Zhang .............. 370/392 |
| 9,021,341 B1 | 4/2015 | Srinivasa et al. |
| 9,077,594 B2 | 7/2015 | Banerjea et al. |
| 9,088,466 B2 | 7/2015 | Banerjea |
| 9,124,402 B2 | 9/2015 | Nabar et al. |
| 9,294,249 B2 | 3/2016 | Nabar et al. |
| 2001/0038619 A1 | 11/2001 | Baker et al. |
| 2002/0150058 A1 | 10/2002 | Kim et al. |
| 2002/0174172 A1 | 11/2002 | Hatalkar |
| 2004/0136465 A1 | 7/2004 | Hwang et al. |
| 2004/0146018 A1 | 7/2004 | Walton et al. |
| 2004/0203472 A1 | 10/2004 | Chien |
| 2004/0208253 A1 | 10/2004 | Joo |
| 2005/0013239 A1 | 1/2005 | Agrawal et al. |
| 2005/0015703 A1 | 1/2005 | Terry et al. |
| 2005/0068900 A1 | 3/2005 | Stephens et al. |
| 2005/0111451 A1 | 5/2005 | Kim |
| 2005/0136933 A1 | 6/2005 | Sandhu et al. |
| 2005/0195786 A1 | 9/2005 | Shpak |
| 2005/0195858 A1 | 9/2005 | Nishibayashi et al. |
| 2005/0233709 A1 | 10/2005 | Gardner et al. |
| 2005/0254457 A1 | 11/2005 | Jung et al. |
| 2005/0281243 A1 | 12/2005 | Horn et al. |
| 2006/0007898 A1 | 1/2006 | Maltsev et al. |
| 2006/0009189 A1 | 1/2006 | Kim et al. |
| 2006/0045048 A1 | 3/2006 | Kwon et al. |
| 2006/0114865 A1 | 6/2006 | Hashimoto et al. |
| 2006/0114878 A1 | 6/2006 | Choe et al. |
| 2006/0120341 A1 | 6/2006 | Del Prado Pavon et al. |
| 2006/0176968 A1 | 8/2006 | Keaney et al. |
| 2006/0233271 A1 | 10/2006 | Savas et al. |
| 2006/0250938 A1 | 11/2006 | Khan et al. |
| 2006/0268671 A1 | 11/2006 | Coon |
| 2006/0280134 A1 | 12/2006 | Kwon et al. |
| 2006/0280155 A1 | 12/2006 | Kwon et al. |
| 2007/0047666 A1 | 3/2007 | Trachewsky |
| 2007/0049208 A1 | 3/2007 | Kim et al. |
| 2007/0070927 A1 | 3/2007 | Shoki et al. |
| 2007/0081602 A1 | 4/2007 | Tanaka et al. |
| 2007/0086400 A1 | 4/2007 | Shida et al. |
| 2007/0153725 A1 | 7/2007 | Waxman |
| 2007/0211823 A1 | 9/2007 | Mazzarese et al. |
| 2007/0230338 A1 | 10/2007 | Shao et al. |
| 2008/0049654 A1 | 2/2008 | Otal et al. |
| 2008/0118011 A1 | 5/2008 | Trachewsky et al. |
| 2008/0205317 A1 | 8/2008 | Piipponen et al. |
| 2008/0227475 A1 | 9/2008 | Suemitsu et al. |
| 2008/0253328 A1 | 10/2008 | Sahinoglu et al. |
| 2008/0298435 A1 | 12/2008 | Lakkis |
| 2008/0299962 A1 | 12/2008 | Kasher |
| 2009/0022093 A1 | 1/2009 | Nabar et al. |
| 2009/0022128 A1 | 1/2009 | Nabar et al. |
| 2009/0060094 A1 | 3/2009 | Jung et al. |
| 2009/0190547 A1 | 7/2009 | Shi et al. |
| 2009/0196163 A1 | 8/2009 | Du |
| 2009/0257476 A1 | 10/2009 | Watanabe |
| 2009/0285319 A1 | 11/2009 | Zhang et al. |
| 2010/0046358 A1 | 2/2010 | van Nee |
| 2010/0046656 A1 | 2/2010 | van Nee et al. |
| 2010/0074362 A1 | 3/2010 | Lim et al. |
| 2010/0098146 A1 | 4/2010 | Kim et al. |
| 2010/0158164 A1 | 6/2010 | Oh et al. |
| 2010/0166087 A1 | 7/2010 | Lomnitz |
| 2010/0246543 A1 | 9/2010 | Rajkotia et al. |
| 2010/0309958 A1 | 12/2010 | Lakkis |
| 2011/0002219 A1 | 1/2011 | Kim et al. |
| 2011/0002280 A1 | 1/2011 | Davydov et al. |
| 2011/0002430 A1 | 1/2011 | Kim et al. |
| 2011/0051705 A1 | 3/2011 | Jones, IV et al. |
| 2011/0096796 A1 | 4/2011 | Zhang et al. |
| 2011/0134899 A1 | 6/2011 | Jones, IV et al. |
| 2011/0142020 A1 | 6/2011 | Kang et al. |
| 2011/0299382 A1 | 12/2011 | Van Nee et al. |
| 2011/0305178 A1 | 12/2011 | Zheng et al. |
| 2011/0305296 A1 | 12/2011 | Van Nee |
| 2012/0039406 A1 | 2/2012 | Srinivasa et al. |

(56) References Cited

U.S. PATENT DOCUMENTS

| | | | |
|---|---|---|---|
| 2012/0195391 | A1 | 8/2012 | Zhang et al. |
| 2012/0201316 | A1 | 8/2012 | Zhang et al. |
| 2012/0224570 | A1 | 9/2012 | Seok et al. |
| 2012/0294294 | A1 | 11/2012 | Zhang |
| 2012/0300874 | A1 | 11/2012 | Zhang |
| 2012/0320889 | A1 | 12/2012 | Zhang et al. |
| 2013/0016642 | A1 | 1/2013 | Banerjea et al. |
| 2013/0016737 | A1 | 1/2013 | Banerjea |
| 2013/0051260 | A1 | 2/2013 | Liu |
| 2013/0177096 | A1 | 7/2013 | Park et al. |
| 2013/0202001 | A1 | 8/2013 | Zhang |
| 2013/0235908 | A1 | 9/2013 | Zhang et al. |
| 2013/0243115 | A1 | 9/2013 | Taghavi Nasrabadi et al. |
| 2013/0287043 | A1 | 10/2013 | Nanda et al. |
| 2014/0071973 | A1 | 3/2014 | Nabar et al. |
| 2015/0003276 | A1 | 1/2015 | Liu |
| 2015/0136933 | A1 | 5/2015 | Merzon |
| 2015/0155998 | A1 | 6/2015 | Nabar et al. |

FOREIGN PATENT DOCUMENTS

| | | |
|---|---|---|
| CN | 101263690 A | 9/2008 |
| EP | 1087630 A1 | 3/2001 |
| EP | 1286491 A1 | 2/2003 |
| EP | 1357693 A1 | 10/2003 |
| EP | 1545025 A1 | 6/2005 |
| EP | 1598975 A2 | 11/2005 |
| EP | 1679803 A2 | 7/2006 |
| JP | 64-021059 | 1/1989 |
| JP | 62176235 | 1/1989 |
| JP | 06268575 | 9/1994 |
| JP | H11-275056 A | 10/1999 |
| JP | 2003179581 A | 6/2003 |
| JP | 2005102136 A | 4/2005 |
| JP | 2005509360 A | 4/2005 |
| JP | 2005512447 A | 4/2005 |
| JP | 2005514859 A | 5/2005 |
| JP | 2005236686 A | 9/2005 |
| JP | 2006504335 A | 2/2006 |
| JP | 2006197586 A | 7/2006 |
| JP | 2006254235 A | 9/2006 |
| JP | 2006295736 A | 10/2006 |
| JP | 2006319959 A | 11/2006 |
| JP | 2006333236 A | 12/2006 |
| JP | 2007096744 A | 4/2007 |
| JP | 2007110317 A | 4/2007 |
| JP | 2007110456 A | 4/2007 |
| JP | 2007124376 A | 5/2007 |
| JP | 2007520161 A | 7/2007 |
| JP | 2010200122 A | 9/2010 |
| WO | WO-03005652 A1 | 1/2003 |
| WO | WO-03041300 A1 | 5/2003 |
| WO | WO-03058881 A2 | 7/2003 |
| WO | WO-2004084436 A1 | 9/2004 |
| WO | WO-2005067212 A1 | 7/2005 |
| WO | WO-2005079012 A1 | 8/2005 |
| WO | WO-2006000988 A1 | 1/2006 |
| WO | WO-2006020520 A2 | 2/2006 |
| WO | WO-2006048037 A1 | 5/2006 |
| WO | WO-2006051771 A1 | 5/2006 |
| WO | WO-2006054252 A1 | 5/2006 |
| WO | WO-2006132506 A1 | 12/2006 |
| WO | WO-2007043108 A1 | 4/2007 |
| WO | WO-2007052150 A1 | 5/2007 |
| WO | WO-2007073040 A1 | 6/2007 |
| WO | WO-2009012448 A2 | 1/2009 |
| WO | WO-2009059229 A1 | 5/2009 |
| WO | WO-2009114612 A1 | 9/2009 |
| WO | WO-2010095793 A1 | 8/2010 |
| WO | WO-2010120692 A1 | 10/2010 |
| WO | WO-2011006108 A2 | 1/2011 |
| WO | WO-2011031058 A2 | 3/2011 |
| WO | WO-2011031454 A1 | 3/2011 |
| WO | WO-2011049314 A2 | 4/2011 |
| WO | WO-2012122119 A1 | 9/2012 |

OTHER PUBLICATIONS

U.S. Appl. No. 13/159,143, filed Jun. 13, 2011, Srinivasa et al.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancement for Higher Throughput," The Institute of Electrical and Electronics Engineers, Inc., Sep. 2007; 544 pages.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancement for Higher Throughput," The Institute of Electrical and Electronics Engineers, Inc., Oct. 29, 2009; 535 pages.

International Search Report and Written Opinion of the International Searching Authority for corresponding International Application No. PCT/US2011/043134, mailed Nov. 2, 2011, 10 Pages.

Alcatel-Lucent et al, Dedicated Reference Signals for MU-MIMO Precoding in E-UTRA Downlink, 3GPP R1-071069, Feb. 16, 2007; 3 Pages.

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 Pages.

Chang, Yuang; Wang, Junyi; Zhu, Houtao; Kashima, Tsuyoshi; Araki, Kiyomichi; Integrated User Scheduling Algorithm for Multi-User MIMO-Downlink System; IEICE Technical report; Jun. 21, 2007, vol. 107, No. 113, pp. 91-96; RCS2007-26.

de Vegt, Rolf, IEEE 802.11-11/0457r0, Potential Compromise for 802.11ah Use Case Document, Mar. 17, 2011, 27 pages.

First Office Action from Chinese Patent Office for Chinese Patent Application No. 200800250809; Translated; 7 Pages.

Freescale Semiconductor Inc., Downlink reference signaling for MU-MIMO, 3GPP R1-071509, Mar. 17, 2007; 4 Pages.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

Haene et al., "A Real-Tim 4-Stream MIMO-OFDM Transceiver: System Design, FPGA Implementation, and Characterization," IEEE Journal on Selected Areas in Communications, vol. 26, No. 6 ( Aug. 2008); 13 Pages.

Harada, "Project: IEEE P802.15 Working Group for Wireless Personal Area Network (WPANs)," IEEE 802.15-07-0693-003c (May 2007).

Huaning Niu et al., "Advanced Wireless Communication Systems and Techniques", Jul. 6, 2009, U.S. Appl. No. 61/223,360, 93 Pages.

IEEE 802.11-11/0421rl, D1.0 PHY Comments Discussion, Mar. 15, 2011, 14 pages.

IEEE 802.11-11/1483rl, 11ah Preamble for 2MHz and Beyond, Nov. 7, 2011, 17 pages.

IEEE 802.11ah; IEEE 802.11-1110035r0; Heejung Yu, Il-gy Lee, Minho Cheng, Hun Sik Kang, Sok-kuy Lee; Dated Jan. 12, 2011; 10 Pages.

IEEE 802.16; IEEE Standard for Local and Metropolitan Area Networks; Part 16: Air Interface for Broadband Wireless Access Systems: IEEE Computer Society and the IEEE Microwave Theory and Techniques Society; 2009; 2082 Pages.

IEEE 802.20-PD-06; IEEE P 802.20™ V14; Jul. 16, 2004; Draft 802.20 Permanent Document; System Requirements for IEEE 802. 20 Mobile Broadband Wireless Access. Systems-Version 14; 24 pages.

IEEE P802.11, Wireless LANs, Mar. 2012, 2793 pages.

IEEE P802.11-09/0992r11—Specification Framework for Tgac, [Online] May 18, 2010, retrieved from the Internet: https://mentor.ieee.org/802.11/dcn/09/11-09-0992-11-00ac-proposed-specifiction-framework-for-tgac.doc, pp. 1-10.

(56) References Cited

OTHER PUBLICATIONS

IEEE P802.11ac/D0.2 Draft Standard for Information Technology Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz, Jan. 2012, 359 pages.

IEEE P802.11ac/D0.2 Draft Standard for Information Technology Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz, Mar. 2011, 184 pages.

IEEE P802.11nTM, IEEE Standard for Information Technology—Telecommunication and information exchange between systems—Local and metropolitan area networks—Specific requirements; Part 11: Wireless LAN Medium Access Control (MAC) and Physcial Layer (PHY) Specifications; Amendment 5 Enhancements for Higher Throughput; "The Institute of Electrical and Electronics Engineers, Inc." Oct. 2009.

IEEE P802.11nTM/D3.00, Draft Standard for Information Technology—Telecommunication and information exchange between systems—Local and metropolitan area networks—Specific requirements; Part 11: Wireless LAN Medium Access Control (MAC) and Physcial Layer (PHY) Specifications; Amendment 4 Enhancements for Higher Throughput; "The Institute of Electrical and Electronics Engineers, Inc." Sep. 2007.

IEEE Std 802.11-2007 (Revision of IEEE Std. 802.11-1999) Information Standard for Information Technology—Telecommunications and information exchange between systems—Local and metropolitan area networks—Specific requirements—Part 11: Wireless LAN Medium Access Control (MAC) and Phsycial Layer (PHY) specifications, "The Institution of Electrical and Electronics Engineers, Inc.," Jun. 12, 2007; 1232 Pages.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999); 91 Pages.

IEEE Std 802.11ac/D2.0 Draft Standard for Information Technology—Telecommunications and information exchange between systems—Local and metropolitan area networks—Specific requirements—Part 11: Wireless LAN Medium Access Control (MAC) and Phsycial Layer (PHY) specification: Amendment 4: Enhancements for Very High Throughput for Operation in Bands below 6 GHz, The Institution of Electrical and Electronics Engineers, Inc., Jan. 2012; 359 Pages.

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operations," The Institute of Electrical and Electronics Engineers, Inc., Nov. 2011; 123 Pages.

IEEE Std 802.11b-1999 (Supplement to IEEE Std 802.11-1999 Edition); Supplement to IEEE Standard for Information technology—Telecommunications and information exchange between systems—Local and Metropolitan area networks—Specific requirements—Part 11: Wireless LAN Medium Access control (MAC) and Physical Layer (PHY) specifications: Higher-Speed Physical Layer Extension in the 2.4 GHz Band: LAN/MAN Standards Committee of the IEEE Computer Society; Sep. 16, 1999 IEEE-SA Standards Board; 96 pages.

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," The Institute of Electrical and Electronics Engineers, Inc. Nov. 7, 2001; 23 pages.

IEEE Std 802.11g/D2.8, May 2002 (Supplement to ANSI/IEEE Std 802.11, 1999 Edition) Draft Supplement to Standard [for] Information Technology—Telecommunications and information exchange between systems—Local and metropolitan area networks—Specific requirements—Part 11: Wireless LAN Medium Access Control (MAC) and Phsycial Layer (PHY) specifications: Further Higher-Speed Physical Layer Extension in the 2.4 GHz Band, "The Institution of Electrical and Electronics Engineers, Inc.," May 2002; 53 Pages.

IEEE Std 802.11h™-2003 [Amendment to IEEE Std 802.11™, 1999 Edition (Reaff 2003) as amended by IEEE Stds 802.11a™-1999, 802,11b™-1999, 802.11b™-1999/Cor Jan. 2001, 802,11d™-2001, 802.11g™-2003]; IEEE Standard for Information Technology—Telecommunications and information exchange between systems—Local and metropolitan area networks—Specific requirements: Part 11: Wireless LAN Medium Access Control (MAC) and Physical Layer (PHY) specifications; Amendment 5: Spectrum and Transmit Power Mangement Extensions in the 5 GHz band in Europe; IEEE Computer Society; LAN/MAN Standards Committee; Oct. 14, 2003; 75 Pages.

IEEE Std 802.11™-2012, IEEE Standard for Information technology—Telecommunications and information exchange between systemsLocal and metropolitan area networks—Specific requirements, Part 11: Wireless LAN Medium Access Control (MAC) and Physical Layer (PHY) Specifications, Mar. 29, 2012, 2793 pages.

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

IEEE Std 802.16TM-2001; IEEE Standard for Local and metropolitan area networks, Part 16: Air Interface for Fixed Broadband Wireless Access Systems; LAN/MAN Standards Committee, IEEE Computer Society and IEEE Microwave Theory and Techniques Society; Apr. 8, 2002; 349 Pages.

IEEE Std P802.11-REVma/06.0, "Unapproved Draft Standard for Information Technology—Telecommunications and information exchange between systems—Local and metropolitan area networks—Specific requirements—Part 11: Wireless LAN Medium Access Control (MAC) and Phsycial Layer (PHY) specification. (This document reflects the combining of the 2003 of the 2003 Edition of 802.11 plus the 802.11g, 802.11h 802.11i and 802.11j Amendments) (Revision of IEEE Std 802.11-1999)(Superseded by P802.11-REVma_D7.0)," 2006; 1212 Pages.

IEEE Std P802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The institute of Electrical and Electronics Engineers, Inc.*, Apr. 2003; 69 Pages.

IEEE Std. P802.11ad/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," The Institute of Electrical and Electronics Engineers, Inc., Sep. 2011.

Imashioya et al., "RTL Design of 1.2 Gbps MIMO WLAN System and its Business Aspect," IEEE 9th Int'l Symposium on Communications and Information Technology (ISCIT 2009), The Institute of Electrical and Electronics Engineers 2009; pp. 296-301.

International Preliminary Report on Patentability in corresponding PCT/US2012/022768 dated Jul. 30, 2013.

(56) References Cited

OTHER PUBLICATIONS

International Search Report and Written Opinion for International Application No. PCT/US2012/022768, dated Jul. 5, 2012; 17 Pages.
International Search Report and Written Opinion of the International Searching Authority, dated Jul. 19, 2012; in reference to PCT/US/2012/036917, filed Aug. 5, 2012; 15 pages.
Invitation to Pay Additional Fees and Partial International Search Report for International Application No. PCT/US2012/022769, dated Apr. 26, 2012; 8 Pages.
Invitation to Pay Additional Fees and, where Applicable, Protest Fee dated Jan. 21, 2009 in reference to PCT/US2008/070469; 25 Pages.
Japanese Office Action dated Apr. 17, 2013; 6 Pages.
Japanese Office Action dated Nov. 28, 2013 for Japnese Application No. 2012-165994; 2 Pages.
Japanese Rejection for Japanese Patent Application No. 2014-511395 dated Dec. 16, 2014; 4 pages.
Notice of Reason for Rejection from Japanese Patent Office for Japanese Patent Application No. 2010-517185; Translation from RYUKA IP Law Firm; 3 Pages.
Notification of Transmittal of the Inernational Search Report and the Written Opinion of the International Searching Authority dated Oct. 17, 2012; International Application No. PCT/US2012/046929, International Filing Date Jul. 16, 2012; 4 Pages.
Notification of Transmittal of the International Search Report and the Written Opinion of the International Searching Authority dated Oct. 17, 2012; International Application No. PCT/US2012/046929, International Filing Date Jul. 16, 2012; 7 pages.
Notification of Transmittal of the International Search Report and the Written Opinion of the International Searching Authority for PCT/US2012/046908, International Filing Date Jul. 16, 2012, 13 pages.
Notification of Transmittal of the International Search Report and the Written Opinion of the International Searching Authority, or the Declaration dated Dec. 23, 2008 in reference to PCT/US2008/070466; 14 pages.
Office Action for U.S. Appl. No. 13/477,920 mailed Jan. 28, 2014.
Park, "Proposed Specification Framework for Tgah", The Institute of Electrical and Electronics Engineers, doc. No. IEEE 802.11-11/1137r6, Mar. 2012.
Perahai, et al., "Gigabit Wireless LANs: an overview of IEEE 802.11ac and 802.11ad," ACM SIGMOBILE Mobile Computing and Communications Review, vo. 15, No. 3, Jul. 2011; pp. 23-33.
S. A. Mujaba, IEEE P802.11-04/0889r6 "Wireless LANs TGn Synce Proposeal Technical Specification" May 2005; 134 Pages.
S. A. Mujaba, "IEEE P802.11a-1999 (Supplement to IEEE Std 802.11-1999)" Supplement to IEEE Standard for Information technology—Telecommunications and information exchange between systems—Local and metropolitan area netwoks—Specifc requirements—Part 11: Wireless LAN Medium Access Control (MAC) and Physical Layer (PHY) Specifications; High-Speed Physical Layer in the 5 GHz Band, *"The Institute of Electrical and Electronics Engineer, Inc."* (1999).
S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005; 131 Pages.
Second Office Action in corresponding European Patent Application No. 08 782 054.4 dated Feb. 3, 2011.
Shi et al., "Phase Tracking During VHT-LTF," doc. No. IEEE 802.11-10/0771r0, The Institute of Electrical and Electronics Engineers, Jul. 2010; 19 Pages.
Specification of the Bluetooth System—Specification vol. 0; Master Table of Contents & Compliance Requirements; Covered Core Package version: 2.0+EDR; Current Master Toc issued: Nov. 4, 2004; Part A, pp. 1-74; vol. 1, pp. 1-92; vol. 2 & 3, pp. 1-814; vol. 4, pp. 1-250.
Srinivasa et al., U.S. App. No. 13/159,143, filed Jun. 13, 2011.
Stacey et al., "IEEE P802.11, Wireless LANs Propsed Tgac Draft Amendment," The Institution of Electrical and Electronics Engineers, Inc., doc. No. IEEE 802.11-10/1361r3; Jan. 2011; 154 Pages.

Stacey et al., "Specification Framework for Tgac," document No. IEEE 802.11-09-0992r20, The Institution of Electrical and Electronics Engineers, Inc., Jan. 18, 2011 pp. 1-49.
Syafei et al., "A Design of Next Generation Gigabit MIMO Wireless LAN System," IEEE 12th Int'l Conference on Advanced Communication Technology (ICACT 2010), The Institute of Electrical and Electronics Engineers 2010; pp. 941-946.
Syafei et al., "A Gigabit MIMO WLAN System with International Standardization Strategy," IEEE Int'l Symposium on Intelligent Signal Processing and Communication Systems (ISPACS 2009), The Institute of Electrical and Electronics Engineers, Dec. 7, 2009; pp. 228-231.
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), The Institute of Electrical and Electronics Engineers, 2009; pp. 207-211.
Taghavi et al., "Introductory Submission for Tgah", doc No. IEEE 802.11-11/0062r0, Institute for Electrical and Electronics Engineers, pp. 1-5 (Jan. 14, 2011); 6 Pages.
The International Search Report and the Written Opinion of the International Searching Authority, or the Declaration mailed Mar. 11, 2003 for International Application No. PCT/US2008/070469 filed Jul. 18, 2008; 15 Pages.
Van Nee et al., "The 802.11n MIMO-OFDM Standard for Wireless LAN and Beyond," Wireless Personal Communications, vol. 37 pp. 445-453 (2006).
van Zelst et al., "Pilot Sequence for VHT-DATA," doc. No. IEEE 802.11-10/0811r1, The Institute of Electrical and Electronics Engineers, Jul. 2010; 10 Pages.
Vermani et al., "Spec Framework Text for Phy Numerology," The Institute of Electrical and Electronics Engineers, doc. No. IEEE 802.11-11/1311r0, Sep. 2011; 5 Pages.
Vermani, et al., "Preamble Format for 1 MHz," The Institute of Electrical and Electronics Engineers, doc. No. IEEE 802.11-11/1482r2, (Nov. 2011); 30 Pages.
Yu, et al., "Coverage extension for IEEE 802.11ah," The Institute of Electrical and Electronics Engineers, doc. No. IEEE 802.11-11/0035r1, (Nov. 2011); 10 Pages.
Zhang et al., "11ah Data Transmission Flow," The Institute of Electrical and Electronics Engineers, doc. No. IEEE 802.11-11/1484r1, (Nov. 2011); 15 Pages.
Zhang et al., U.S. App. No. 12/730,651, filed Mar. 24, 2010.
Chen, "Home Network Basis: Transmission Environments and Wired/Wireless Protocols," Prentice Hall, pp. 1-26 (Jul. 2003).
English Translation of Office Action for Japanese Application No. 2013-171165 dated Jul. 7, 2015; 3 pages.
Hiertz et al., "The IEEE 802.11 Universe," IEEE Communications Magazine, pp. 62-70 (Jan. 2010).
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4 Enhancements for Very High Throughput for Operation in Bands below 6 GHz," The Institute of Electrical and Electronics Engineers, Inc., pp. 1-363 (Mar. 2012).
IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4 Enhancements for Very High Throughput for Operation in Bands below 6 GHz," The Institute of Electrical and Electronics Engineers, Inc., pp. 1-385 (Jun. 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4 Enhancements for Very High Throughput for Operation in Bands below 6 GHz," The Institute of Electrical and Electronics Engineers, Inc., pp. 1-408 (Oct. 2012).

(56) References Cited

OTHER PUBLICATIONS

Japanese Office Action for related Japanese Application No. 2013-171165 dated Feb. 17, 2015; 2 pages.
Lee et al., "TGaf PHY proposal," The Institute of Electrical and Electronics Engineers, doc. No. IEEE 802.11-12/0809r5, pp. 1-43 (Jul. 10, 2012).
Notice of Allowance in U.S. Appl. No. 13/689,244, dated May 15, 2015 (12 pages).
Office Action for U.S. Appl. No. 13/689,244, dated Feb. 23, 2015.
Office Action for U.S. Appl. No. 13/689,244, dated Jul. 17, 2014.
Office Action in U.S. Appl. No. 13/689,183, dated Aug. 1, 2014.
Office Action in U.S. Appl. No. 13/689,183, dated Feb. 4, 2015.
Office Action in U.S. Appl. No. 13/689,183, dated Jun. 29, 2015.
Office Action in U.S. Appl. No. 13/689,223, dated Apr. 9, 2014.
Office Action in U.S. Appl. No. 13/689,223, dated Mar. 17, 2015.
Office Action in U.S. Appl. No. 13/689,223, dated Sep. 11, 2014.
Park, "Proposed Specification Framework for Tgah D9.x", The Institute of Electrical and Electronics Engineers, doc. No. IEEE 802.11-1yy/xxxxr0, Jul. 2012.
Park, "Proposed Specification Framework for Tgah", The Institute of Electrical and Electronics Engineers, doc. No. IEEE 802.11-11/1137r11, Sep. 2012.
Park, "Proposed Specification Framework for Tgah", The Institute of Electrical and Electronics Engineers, doc. No. IEEE 802.11-1yy/xxxxr05, Jan. 2012.
Ritt et al.; "Eigen-mode Close-Loop Transmission for E-UTRA MIMO"; 3GPP R1-060421; Feb. 17, 2006; 9 pages.
U.S. Appl. No. 13/689,183, al., "(WLAN) Packets with Midambles," filed Nov. 29, 2012.
U.S. Appl. No. 13/689,223, Zhang, et al., "Long Wireless Local Area Network (WLAN) Packets with Midambles," filed Nov. 29, 2012.
U.S. Appl. No. 13/689,244, Zhang, et al., "Long Wireless Local Area Network (WLAN) Packets with Midambles," filed Nov. 29, 2012.
Zhang et al., "1 MHz Waveform in Wider BW ", The Institute of Electrical and Electronics Engineers, doc. No. IEEE 802.11-12/0309r1, pp. 1-10 (Mar. 2012).
Zhang et al., "Beamforming Feedback for Single Stream," The Institute of Electrical and Electronics Engineers, doc. No. IEEE 802.11-12/1312r0, pp. 1-22 (Nov. 12, 2012).
Japanese Office Action for JP2014-528392 dated Mar. 23, 2016.
English Translation of Office Action for Japanese Application No. 2013-171165 dated Apr. 26, 2016; 5 pages.
Notice of Allowance in U.S. Appl. No. 13/689,244, dated Aug. 21, 2015 (7 pages).
Office Action in U.S. Appl. No. 13/689,183, dated Mar. 3, 2016 (28 pages).
Office Action in U.S. Appl. No. 13/689,223, dated Mar. 31, 2016 (14 pages).
Christian Hoymann, et al.; "Evaluation of Grouping Strategies for and Hierarchical SDMA/TDMA Scheduling Process"; 2007 IEEE international Conference on Communications; Jun. 28, 2007; pp. 5616-5621.
Notice of Allowance in U.S. Appl. No. 131689,244, dated Jan. 13, 2016 (7 pages).
Organized translation of Notice of Reasons for Rejection for Japanese Application No. 2015-218535 issued Aug. 9, 2016; 2 pages.
Shinji Mural, et al.; "Wireless Resource Allocation Methods Based on QoS in MIMO-SDMA/TDMA Systems"; the Institute of Electronics, Information and Communication Engineers (IEICE) Technical Report; vol. 106, No. 168; RCS2006-65; Jul. 12, 2006; pp. 37-42.
Communication pursuant to Article 94(3) EPC in European Patent Application No. 12703655.6, dated Aug. 8, 2016 (8 pages).
Notice of Allowance in U.S. Appl. No. 13/477,920, dated Jun. 6, 2014 (7 pages).
Notice of Allowance in U.S. Appl. No. 13/477,920, dated Sep. 18, 2014 (7 pages).
Second Office Action in Chinese Application No. 201280014281.5, dated Mar. 8, 2015, with English translation (6 pages).
Supplemental Notice of Allowability in U.S. Appl. No. 13/477,920, dated Jul. 15, 2014 (4 pages).
Chinese Search Report for Chinese Application No. 2012800347533 dated Nov. 3, 2016.
Chinese Search Report for Chinese Application No. 2012800421847 dated Dec. 15, 2016.

\* cited by examiner

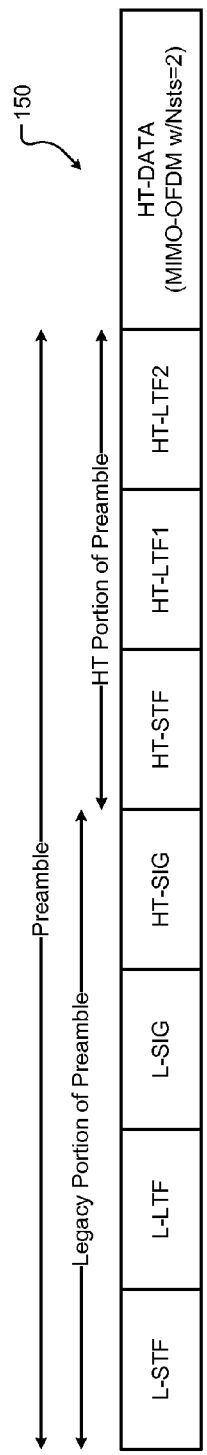
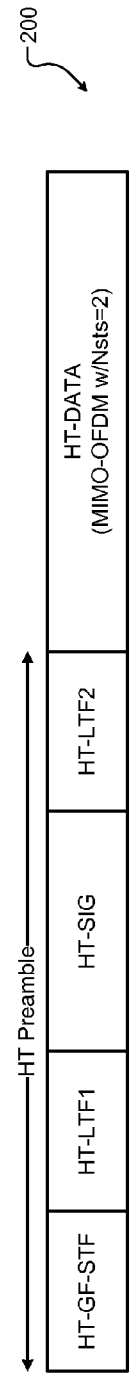
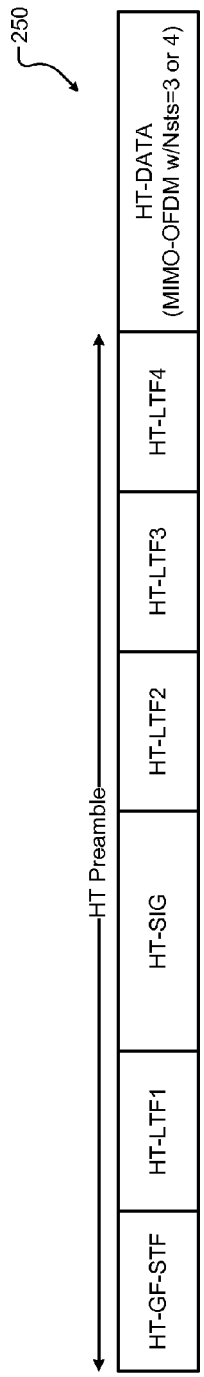
FIG. 1
FIG. 2A
FIG. 2B
FIG. 2C

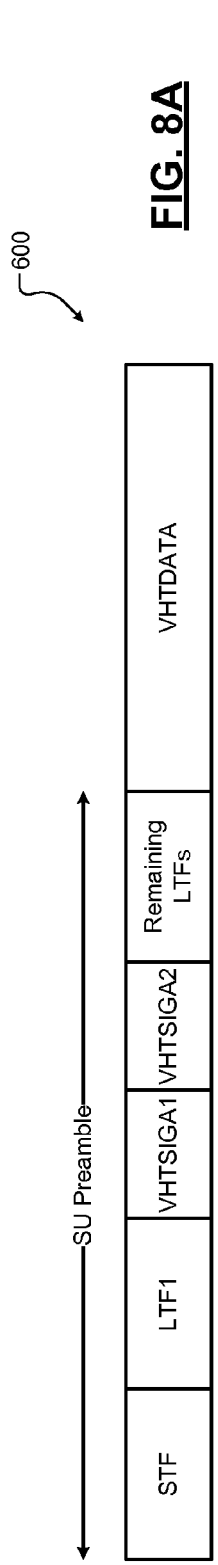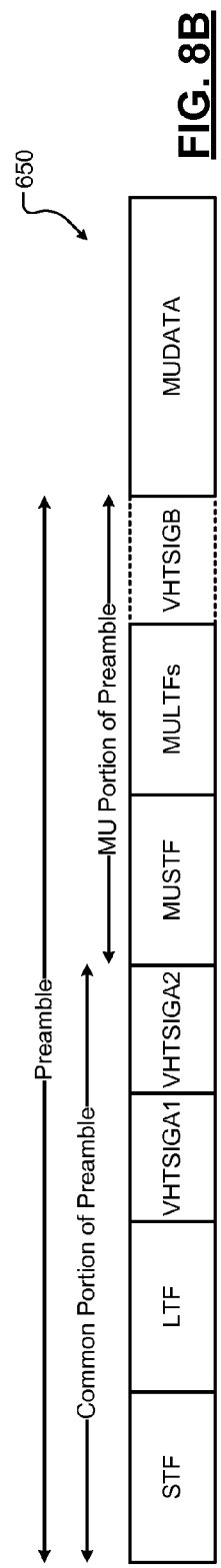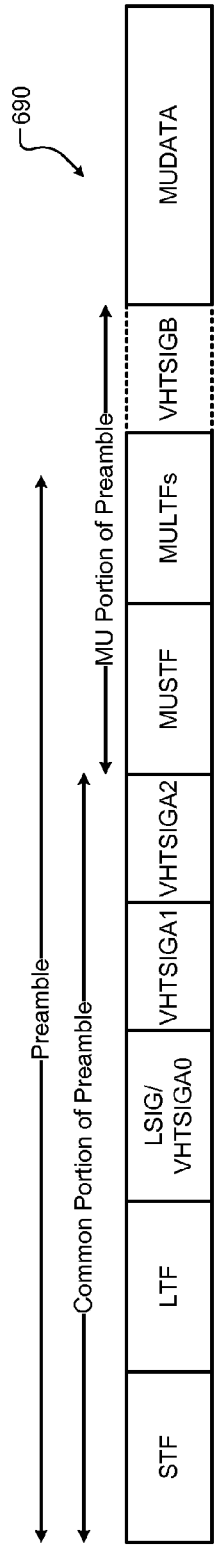

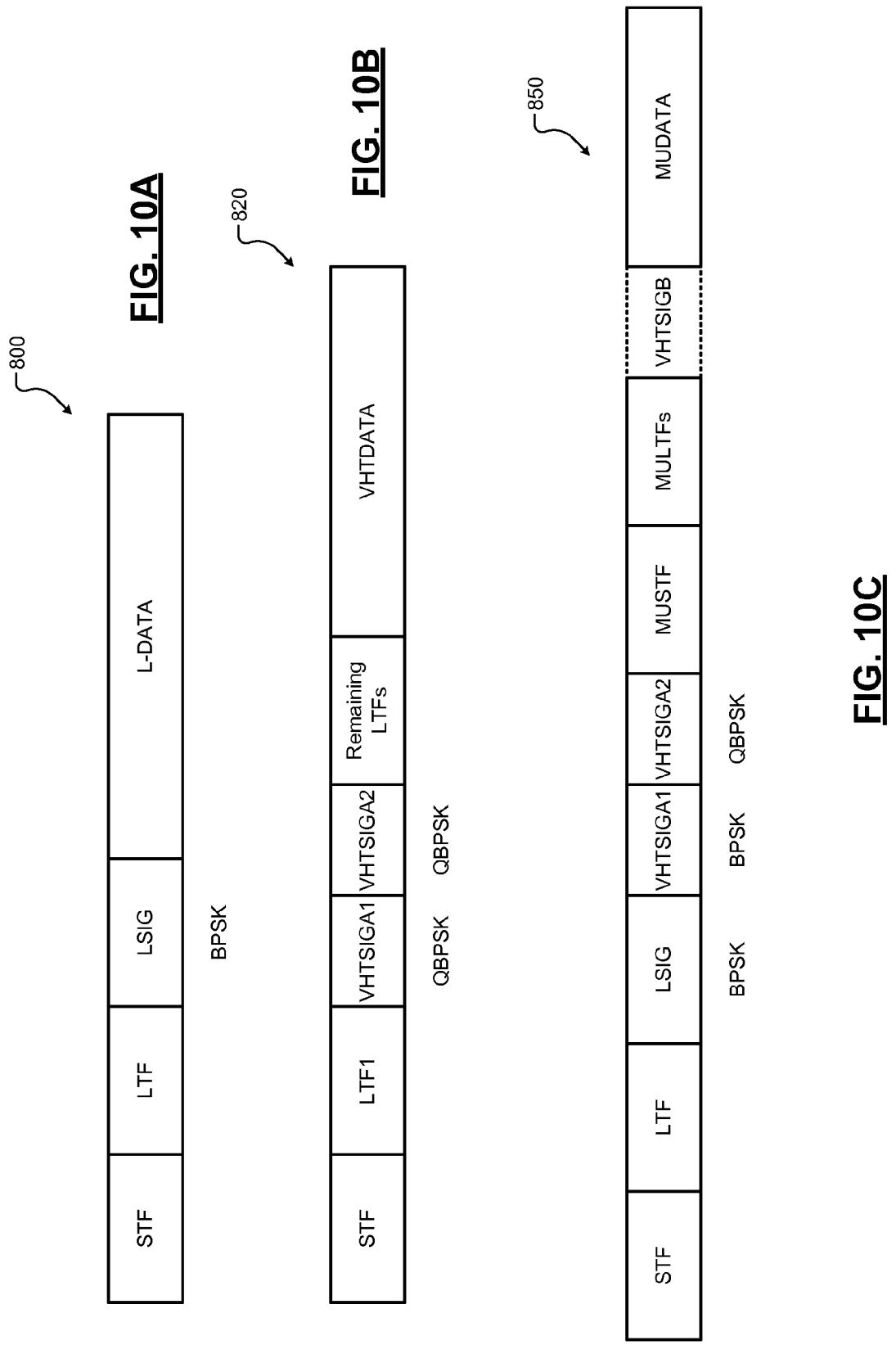

PREAMBLES FOR SUB-1GHZ FREQUENCY BANDS

CROSS-REFERENCE TO RELATED APPLICATIONS

This is a continuation of U.S. patent application Ser. No. 13/464,467 (now U.S. Pat. No. 8,982,889), filed May 4, 2012, which claims the benefit of U.S. Provisional Application No. 61/486,713, filed on May 16, 2011. This disclosure is related to U.S. patent application Ser. No. 13/359,336 (now U.S. Pat. No. 8,867,653), filed Jan. 26, 2012, and to U.S. patent application Ser. No. 12/175,526 (now U.S. Pat. No. 8,144,647), filed on Jul. 18, 2008. The disclosures of the applications referenced above are incorporated herein by reference in their entirety.

FIELD

The present disclosure relates generally to wireless communications and more particularly to preamble designs for sub-1 GHz frequency bands.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Institute of Electrical and Electronics Engineers (IEEE) has developed standards for wireless local area networks (WLANs). Some of the standards, generally denoted as 802.1x, specify operating parameters including frequency bands, modulation and coding schemes, data rates, and packet formats for WLANs.

To provide high data rates, most WLANs operate in high-frequency bands. For example, WLANs compliant with 802.11a/b/g/n/ac/ad standards operate in 2.4 GHz, 5 GHz, or 60 GHz frequency bands and provide data rates ranging from 11 Mbps to more than 1 Gbps. The range of these WLANs is relatively short, however, due to high frequency of operation.

The range of WLANs can be extended by lowering operating frequencies. When the operating frequencies are lowered, however, the data rates also have to be lowered due to low frequency of operation. For example, WLANs compliant with 802.11ah and 802.11af standards operate in a sub-1 GHz frequency band and have longer range but lower data rates than WLANs compliant with 802.11a/b/g/n/ac/ad standards.

SUMMARY

A system including a first preamble generator module configured to generate a first preamble for a first packet, which is a single-user packet. The first preamble includes a first short training field, a first long training field, a first signal field, and a second signal field. A second preamble generator module generates a second preamble for a second packet, which is a multi-user packet formatted as a multi-user packet or a single-user packet formatted as a multi-user packet. The second preamble is longer than the first preamble. The second preamble includes a second short training field, a second long training field, a third signal field, and a fourth signal field. A modulation module modulates at least one of the first signal field and the second signal field of the first preamble differently than at least one of the third signal field and the fourth signal field of the second preamble.

In other features, in response to receiving a packet transmitted via a sub-1 GHz channel in accordance with 802.11ah or 802.11af standards set forth by Institute of Electrical and Electronics Engineers, a difference in modulation between (i) the first signal field and the third signal field or (ii) the second signal field and the fourth signal field allows a receiver to determine whether the packet received is the first packet or the second packet. Further, in response to the receiver being capable of processing the first packet and not the second packet, and in response to the receiver receiving the second packet, at least one of the third signal field and the fourth signal field of the second preamble allow the receiver to (i) determine a duration of the second packet and (ii) not access the sub-1 GHz channel for the duration of the second packet.

In other features, the modulation module is configured to modulate (i) the first signal field and the second signal field of the first preamble and (ii) the third signal field of the second preamble using a first modulation, and modulate the fourth signal field of the second preamble using a second modulation.

In other features, the system further includes a transmit module configured to transmit at least one of the first packet and the second packet from a base station via a sub-1 GHz channel in accordance with 802.11ah or 802.11af standards set forth by Institute of Electrical and Electronics Engineers. The system further includes a receive module configured to determine whether a packet received by a client station is the first packet or the second packet based on a difference in modulation between (i) the first signal field and the third signal field or (ii) the second signal field and the fourth signal field.

In other features, the system further includes a first packet generator module configured to generate the first packet. The first packet includes the first preamble, a first plurality of long training fields, and a first data field including data for a single user.

In other features, the system further includes a second packet generator module configured to generate the second packet. The second packet includes the second preamble, a multi-user short training field, a second plurality of multi-user long training fields, and a second data field including data for multiple users or for a single user.

In other features, the system further includes a first long training field generator module configured to generate the first long training field of the first preamble. The first long training field includes a double guard band, followed by a first long training symbol, a first single guard band, and a second long training symbol.

In other features, the system further includes a second long training field generator module configured to generate the second long training field of the second preamble. The second long training field includes the double guard band, followed by the first long training symbol, a second single guard band, and a third long training symbol. The second single guard band is phase shifted relative to the first single guard band. The third long training symbol is phase shifted relative to the second long training symbol.

In other features, the system further includes a transmit module configured to transmit at least one of the first packet and the second packet from a base station via a sub-1 GHz channel in accordance with 802.11ah or 802.11af standards set forth by Institute of Electrical and Electronics Engineers. The system further includes a receive module configured to determine whether a packet received by a client station is the first packet or the second packet based on a difference in phase between (i) the first single guard band and the second single guard band and (ii) the second long training field and the third long training field.

In other features, the first preamble generator module is configured to set a bit in the first signal field to a first state, and the second preamble generator module is configured to set the bit in the third signal field to a second state. The second state is opposite to the first state.

In other features, the system further includes an encoding module configured to encode the first signal field, the second signal field, the third signal field, and the fourth signal field, to include data to decode the first signal field at the end of the first signal field, and to include data to decode the third signal field at the end of the third signal field.

In other features, the system further includes a transmit module configured to transmit at least one of the first packet and the second packet from a base station via a sub-1 GHz channel in accordance with 802.11ah or 802.11af standards set forth by Institute of Electrical and Electronics Engineers. The system further includes a receive module configured to decode (i) the first signal field based on the data at the end of the first signal field or (ii) the third signal field based on the data at the end of the third signal field, and to determine whether a packet received by a client station is the first packet or the second packet based on a state of the bit in the first signal field or the third signal field prior to decoding the second signal field or the fourth signal field.

In other features, the system further includes an encoding module configured to encode (i) the first signal field and the second signal field jointly, and (ii) the third signal field and the fourth signal field jointly, include data to decode the first signal field and the second signal field at the end of the second signal field, and to include data to decode the third signal field and the fourth signal field at the end of the fourth signal field. The system further includes a packet generator module configured to generate the second packet. The second packet includes the second preamble, a multi-user short training field, a plurality of multi-user long training fields and a payload. The multi-user short training field has a length of a plurality of symbols.

In other features, the system further includes a transmit module configured to transmit at least one of the first packet and the second packet from a base station via a sub-1 GHz channel in accordance with 802.11ah or 802.11af standards set forth by Institute of Electrical and Electronics Engineers. The system further includes a receive module configured to decode (i) the first signal field based on the data at the end of the second signal field or (ii) the third signal field based on the data at the end of the fourth signal field, and to determine whether a packet received by a client station is the first packet or the second packet based on a state of the bit in the first signal field or the third signal field. In response to determining that the packet received is the second packet, the length of the multi-user short training field allows the receive module to reset a gain of an automatic gain control of the receive module prior to receiving the plurality of long training fields of the second packet.

In other features, in response to using binary phase shift keying modulation, the modulation module is configured to add information to an unused (i) constellation axis or (ii) tone. The information is indicative of whether a packet is the first packet or the second packet.

In other features, at least one of the third signal field and the fourth signal field includes user-specific information for multiple users, and the second packet does not include an additional signal field following the second plurality of long training fields to carry the user-specific information.

In other features, the user specific information includes one or more of (i) physical layer (PHY) modes, (ii) modulation and coding schemes, and (iii) number of streams per user for the multiple users.

In other features, the second preamble generator module is configured to store user specific information for each of the multiple users in separate fields within the at least one of the third signal field and the fourth signal field.

In other features, the system further includes an encoder module configured to jointly encode the user specific information for each of the multiple users. The second preamble generator module is configured to store the jointly encoded user specific information for each of the multiple users in the at least one of the third signal field and the fourth signal field.

In other features, the system further includes a data compression module configured to compress the jointly encoded user specific information for all of the multiple users. The second preamble generator module is configured to store the compressed jointly encoded user specific information for all of the multiple users in the at least one of the third signal field and the fourth signal field.

In other features, the first preamble generator module is configured to include a length field in at least one of the first signal field and the second signal field. The length field indicates a length of the first data field of the first packet. The second preamble generator module is configured to include a duration field in at least one of the third signal field and the fourth signal field. The duration field indicates a duration of the second data field of the first packet.

In other features, the length of the first data field is indicated in terms of a number of bytes in the first data field of the first packet, and the duration of the second data field is indicated in terms of a number of symbols in the second data field of the second packet.

In other features, the duration of the second data field of the second packet is indicated in terms of a number of bytes in the second data field. The system further includes a transmit module configured to transmit the second packet from a base station via a sub-1 GHz channel in accordance with 802.11ah or 802.11af standards set forth by Institute of Electrical and Electronics Engineers. The system further includes a receive module configured to determine the duration of the second data field of the second packet based on (i) the number of bytes in the at least one of the third signal field and the fourth signal field and (ii) a lowest of data rates used by the multiple users.

In other features, the system further includes a clock generator module configured to generate a first clock signal having a first frequency. The first frequency is less than a second clock frequency of a second clock signal generated in accordance with 802.11n or 802.11ac standards set forth by Institute of Electrical and Electronics Engineers. The first preamble generator module is configured to generate the first preamble based on the first clock signal. The second preamble generator module is configured to generate the second preamble based on the first clock signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 1 depicts a packet compliant with IEEE 802.11a standard;

FIG. 2A-2C depict packets compliant with IEEE 802.11n standard;

FIGS. 8A-8C depict a first set of preamble designs for IEEE 802.11ah and IEEE 802.11af standards;

FIGS. 10A-10C illustrate different modulations used in preambles to differentiate a single-user packet from a multi-user packet;

DESCRIPTION

Figure 3A:
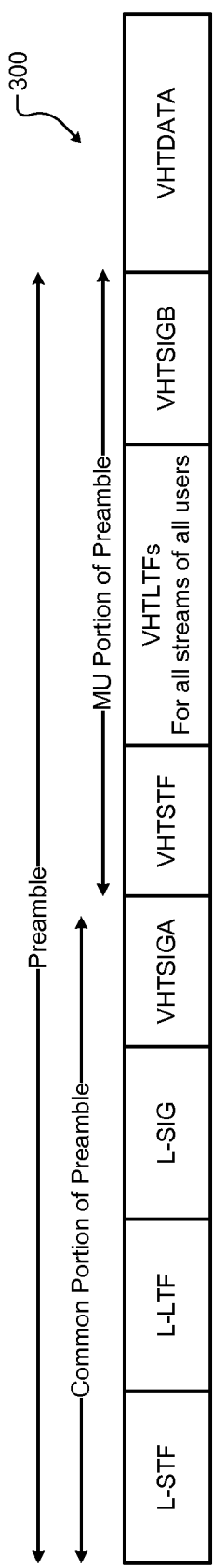
FIGS. 3A and 3B depict packets compliant with the IEEE 802.11ac standard.

Some of the standards developed by IEEE allow transmission of packets using Orthogonal Frequency Division Multiplexing (OFDM). OFDM supports a single-user (SU) mode, where a packet includes data for a single user, and a multi-user multiple-input multiple-output (MU-MIMO) mode, where a packet can include data for multiple users. In the MU-MIMO mode, transmitters with multiple antennas beamform spatial streams to be transmitted to different users in a single packet.

An OFDM packet includes a preamble that indicates whether the packet is a single-user (SU) packet or a multi-user (MU) packet. When a device capable of processing SU packets receives a MU packet (i.e., when the device is an unintended recipient of the MU packet), the device can detect that the packet is a MU packet based on the preamble and can back-off (i.e., not transmit data) for a duration of the MU packet to avoid collisions.

A multi-user portion of the preamble, however, adds unnecessary overhead and processing to single-user packets. Some devices in WLANs compliant with the 802.11ah and 802.11af standards may not support MU-MIMO mode. Accordingly, the present disclosure proposes preamble designs for the 802.11ah and 802.11af standards that include support for MU-MIMO mode as an option. In particular, the preamble design allows receivers to easily differentiate between SU and MU packets and auto-detect whether a packet is a SU packet or a MU packet. The preamble designs include many ways of indicating whether a packet is a SU packet or a MU packet. The indication can be used to spoof receivers capable of processing only SU packets.

Referring now to FIG. 1, a packet 100 compliant with the 802.11a standard for a single-input single-output (SISO) OFDM legacy device is shown. Throughout the disclosure, a prefix "L" denotes a field for a legacy device. The packet 100 includes a preamble and data. The preamble includes a short training field (L-STF), a long training field (L-LTF), and a signal field (L-SIG). A receiver that receives the packet 100 uses the preamble as follows.

The L-STF is used for packet detection, coarse frequency synchronization, and setting a gain of an automatic gain control (AGC) of the receiver to process the packet 100. The L-LTF is used for channel estimation and fine frequency synchronization. The L-SIG is used to indicate physical layer (PHY) parameters such as a modulation and coding scheme (MCS) used to modulate the data in the packet 100. The data includes a single stream of data modulated using the modulation and coding scheme (MCS) indicated in the L-SIG field. Accordingly, the receiver can process the data in the packet 100 based on the preamble.

Referring now to FIGS. 2A-2C, packets 150 and 200 compliant with the 802.11n standard for a MIMO OFDM device are shown. In FIG. 2A, the packet 150 complies with the 802.11n standard and includes a mixed mode (MM) preamble with support (i.e., backward compatibility) for legacy (802.11a) devices. The mixed mode preamble includes a legacy portion and a High Throughput (HT) portion each starting with a corresponding STF (for resetting AGC gain at receiver). In FIG. 2B, the packet 200 complies with the 802.11n standard and includes a Greenfield (GF or HT only) preamble. In other words, the 802.11n standard supports two types of preambles: a mixed mode (MM) preamble and a Greenfield (GF) preamble.

In FIG. 2A, the legacy portion of the mixed mode preamble includes the L-STF, the L-STF, and the L-SIG fields. Additionally, the legacy portion of the mixed mode preamble includes a HT-SIG field. The HT-SIG field indicates a modulation and coding scheme (MCS) used to modulate the data in the packet 150. Additionally, the HT-SIG field indicates a number of long training fields (LTFs) to follow in the HT portion of the preamble.

The HT portion of the preamble includes a HT-STF and a number of long training fields (LTFs) corresponding to a number of spatial streams (Nsts) in the data. For example only, the data includes two spatial streams modulated using the modulation and coding scheme (MCS) indicated in the HT-SIG field. Accordingly, the HT portion of the preamble includes two LTFs following the HT-STF: HT-LTF1 and HT-LTF2. When a legacy device receives the packet 150, the legacy device decodes the legacy portion of the preamble, determines a duration of the packet 150 based on the legacy portion of the preamble (e.g., at the end of the L-SIG field), and backs off (i.e., does not transmit data) for the duration of the packet 150.

In FIG. 2B, the packet 200 includes only the GF preamble and HT data. The GF preamble includes a HT-GF-STF, a HT-LTF1, the HT-SIG, and any additional LTFs corresponding to the number of spatial streams in the data. For example only, the data includes two spatial streams modulated using the modulation and coding scheme (MCS) indicated in the HT-SIG field. Accordingly, the HT-SIG field is followed by HT-LTF2.

In FIG. 2C, an example of a packet 250 compliant with the 802.11n standard for a MIMO OFDM device is shown. The packet 250 includes only the GF preamble and HT data. The GF preamble includes the HT-GF-STF, the HT-LTF1, the HT-SIG, and any additional LTFs corresponding to the number of spatial streams in the data. For example only, the data includes there or four spatial streams modulated using the modulation and coding scheme (MCS) indicated in the HT-SIG field. Accordingly, the HT-SIG field is followed by three HT-LTFs: HT-LTF2, HT-LTF3, and HT-LTF4.

Figure 3B:
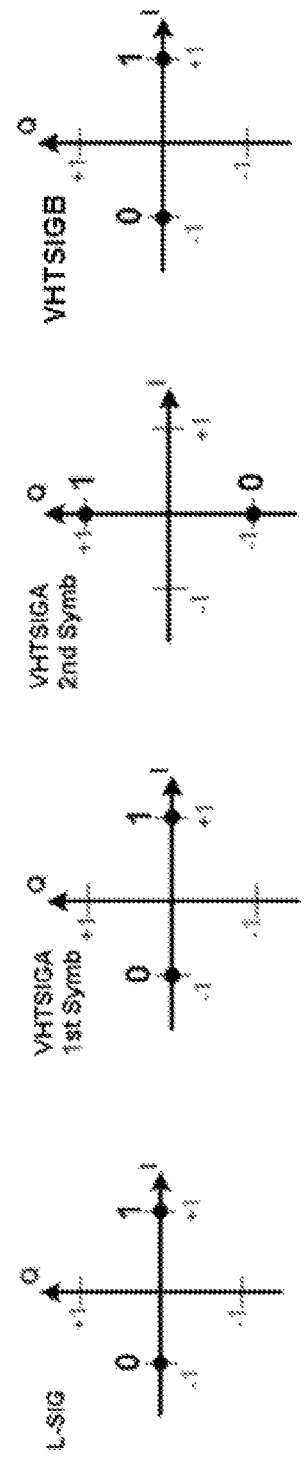

Referring now to FIGS. 3A-3B, a packet 300 compliant with the 802.11ac standard is shown. In FIG. 3A, the packet 300 includes a mixed mode (MM) preamble with support (i.e., backward compatibility) for legacy (802.11a) devices. The mixed mode preamble includes a legacy portion (common portion) and a Very High Throughput (VHT) portion (multi-user (MU) portion). The preamble of the packet 300 has the same structure whether the packet 300 is a single-user (SU) 802.11ac packet or a multi-user (MU) 802.11ac packet. The common portion includes the L-STF, the L-STF, and the L-SIG fields. Additionally, the common portion includes a first Very High Throughput (VHT) SIG field called VHTSIGA. The MU portion includes a VHTSTF, a number of VHTLTFs, and a second VHT SIG field called VHTSIGB.

When the packet 300 is a MU packet, the VHTSIGA field indicates common capabilities of the users that receive the packet 300, and the VHTSIGB field indicates capabilities (e.g., MCS) of each user that receives the packet 300. Each receiver that receives the packet 300 can determine the channel for other receives. If a receiver that receives the packet 300 has additional antennas, the receiver can cancel interference due to signals included in the packet 300 for the other receivers based on the knowledge of channel of other receives.

When the packet 300 is a SU packet, the VHTSIGA field indicates the capabilities (e.g., MCS) of the user receiving the packet 300. The packet 300 nonetheless includes the VHTSIGB field regardless of whether the packet 300 is a SU packet or a MU packet. In other words, the preamble of the packet 300 unnecessarily includes the MU portion even when the packet 300 is a SU packet.

In FIG. 3B, examples of modulation of symbols in the L-SIG, VHTSIGA and VHTSIGB fields are shown. For example only, the VHTSIGA field includes two symbols, each modulated using a different modulation. For example, a first symbol may be modulated using binary phase shift keying (BPSK) modulation, and a second symbol may be modulated using QBPSK modulation, which is phase shifted relative to BPSK by 90 degrees. In contrast, in the packet 150 shown in FIG. 2A, the symbols in the HT-SIG field are modulated using the same modulation (e.g., BPSK). Accordingly, a receiver can determine whether a packet is an 802.11n packet or an 802.11ac packet based on whether the modulation of the symbols in the field following the legacy fields (e.g., modulation of symbols in the HT-SIG field or in the VHTSIGA field) is the same (indicating an 802.11n packet) or different (indicating an 802.11ac packet).

In the 802.11ah and 802.11af standards, since a majority of devices do not support multi-user MIMO mode, the preamble design for the single-user packets can be simplified by providing support for MU-MIMO mode only as an option. The MU portion of the preamble is present only in MU packets. Further, since the 802.11ah and 802.11af standards provide a much lower bandwidth than the 802.11n/ac standards, all of the preamble designs disclosed in the present disclosure for the 802.11ah and 802.11af standards are downclocked relative to the preambles of the 802.11n/ac standards. That is, the clock used to generate the preambles disclosed in the present disclosure for the 802.11ah and 802.11af standards is divided by N, where N is an integer greater than 1. For example, N=10.

The criteria used in designing the preambles disclosed in the present disclosure for the 802.11ah and 802.11af standards are as follows. An unintended single-user (SU) receiver should decode only a portion of the preamble of a packet received, determine a duration of the packet, and back off for the duration of the packet. The unintended SU receiver does not need to decode the entire MU portion of the preamble. Instead, the MU portion of the preamble spoofs the SU receiver with a correct packet duration based on information in the SIG field so that the SU receiver can back off and hold clear channel assessment (CCA) for the correct packet duration. A MU-MIMO receiver or a SU receiver can easily auto-detect whether the preamble is a MU preamble or a SU preamble.

Specifically, two options for SU and MU preambles are disclosed. In the first option, the SU preamble is based on the Greenfield mode and includes a single segment of fields. The MU preamble is based on the mixed mode and includes a common portion and a MU portion. In the second option, the SU preamble and the MU preamble are based on the mixed mode. Before describing these options in detail, following is a description of a base station that generates the preambles according to the present disclosure and transmits packets including these preambles, and client stations that receive the packets and process these preambles.

Figure 4:
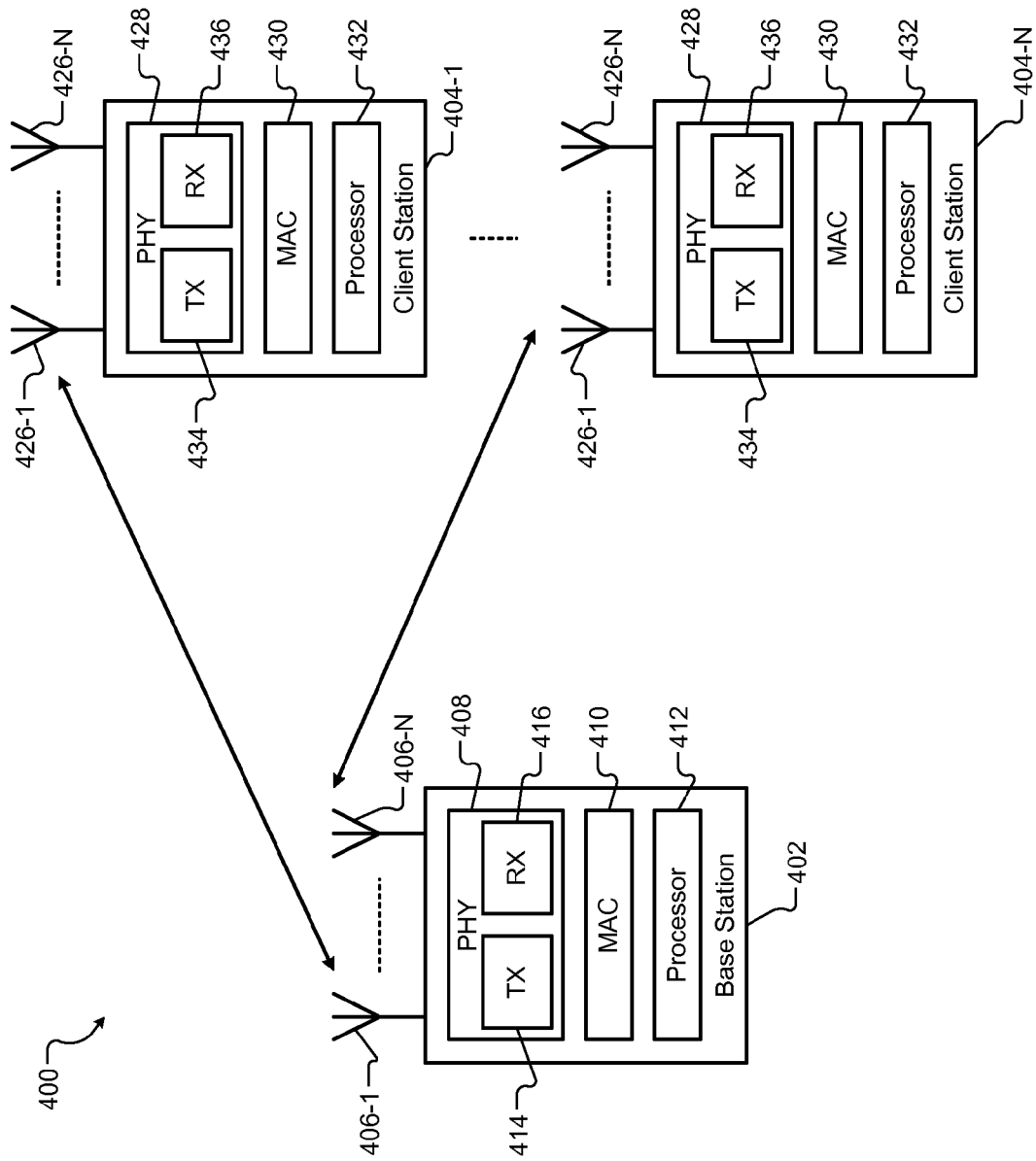
FIG. 4 is a functional block diagram of a wireless local area network.

Referring now to FIG. 4, a WLAN 400 according to the present disclosure is shown. The WLAN 400 operates in accordance with the 802.11ah and 802.11af standards. The WLAN 400 includes a base station 402 and a plurality of client stations 404-1, . . . , and 404-N, where N is an integer greater than 1 (collectively client stations 404). The base station 402 and the client stations 404 are compliant with the 802.11ah and 802.11af standards.

The base station 402 includes a plurality of antennas 406-1, . . . , and 406-N, where N is an integer greater than 1 (collectively antennas 406). The base station 402 includes a physical layer (PHY) 408, a medium access controller (MAC) 410, and a processor 412. The PHY 408 includes a transmitter (TX) 414 and a receiver (RX) 416 that communicate with a wireless channel via the antennas 406. The transmitter 414 and the receiver 416 may be called a transceiver.

The PHY 408 encodes and modulates data to be transmitted by the transmitter 414 and demodulates and decodes data received by the receiver 416. The MAC 410 controls access of the PHY 408 to the wireless channel. The processor 412 processes the data to be transmitted by the transmitter 414 and the data received by the receiver 416. The processor 412 additionally performs other functions of the base station 402.

The client station 404-1 includes a plurality of antennas 426-1, . . . , and 426-N, where N is an integer greater than or equal to 1 (collectively antennas 426). The client station 404-1 includes a physical layer (PHY) 428, a medium access controller (MAC) 430, and a processor 432. The PHY 428 includes a transmitter (TX) 434 and a receiver (RX) 436 that communicate with the wireless channel via the antennas 426. The transmitter 434 and the receiver 436 may be called a transceiver.

The PHY 428 encodes and modulates data to be transmitted by the transmitter 434 and demodulates and decodes data received by the receiver 436. The MAC 430 controls access of the PHY 428 to the wireless channel. The processor 432 processes the data to be transmitted by the transmitter 434 and the data received by the receiver 436. The processor 432 additionally performs other functions of the client station 404-1. One or more of the other client stations 404 may be similar to the client station 404-1. One or more of the other client stations 404 may have a single antenna or multiple antennas.

Figure 5:
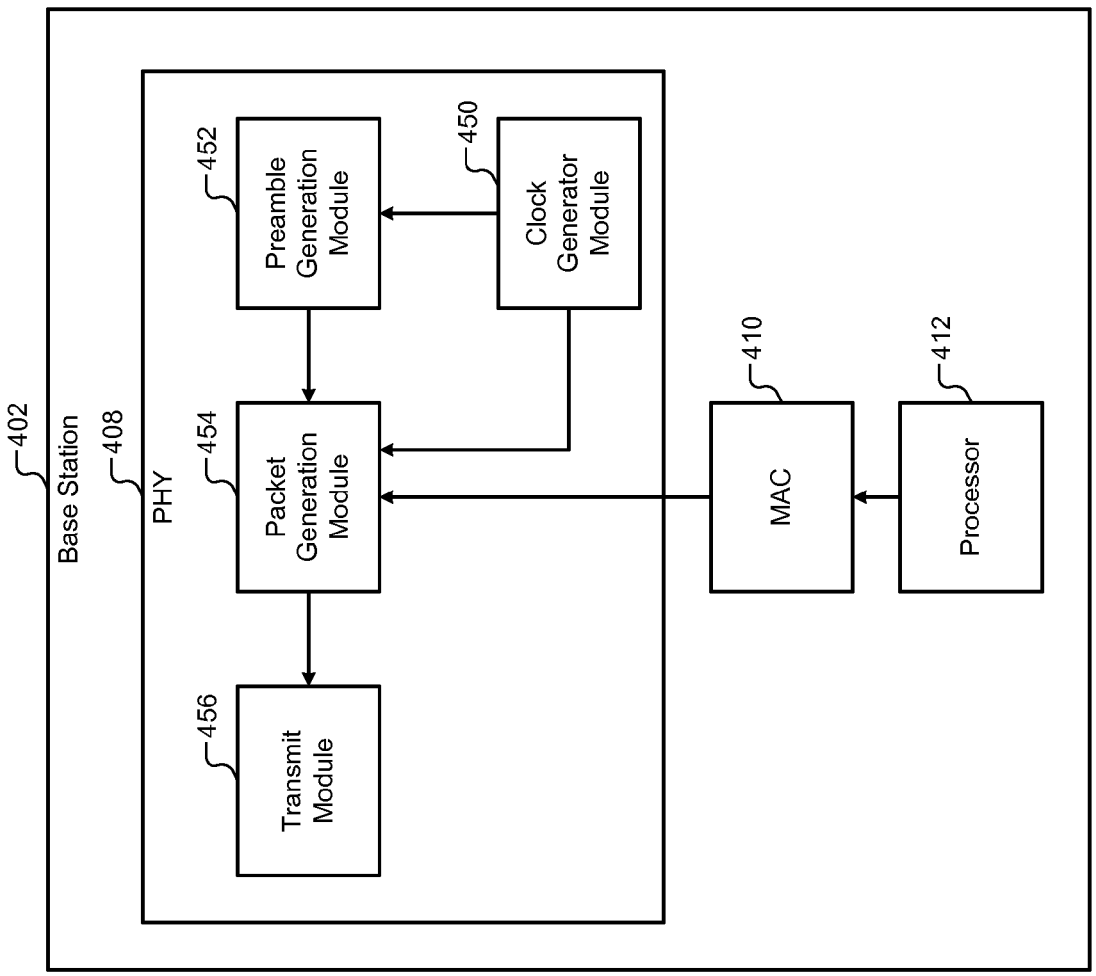
FIG. 5 is a functional block diagram of a base station.

Referring now to FIG. 5, the base station 402 is shown in detail. The PHY 408 includes a clock generator module 450, a preamble generator module 452, a packet generator module 454, and a transmit module 456. The clock generator module 450 generates clock signals used by the preamble generator module 452 and the packet generator module 454. The clock generator module 450 may also generate clock signals used by other components of the base station 402. The preamble generator module 452 generates preambles as described below in detail. The packet generator module 454 generates packets that include the preambles generated by the preamble generator module 452. The transmit module 456 transmits the packets generated by the packet generator module 454. For example, the transmit module 456 may include the transmitter 414.

Figure 6:
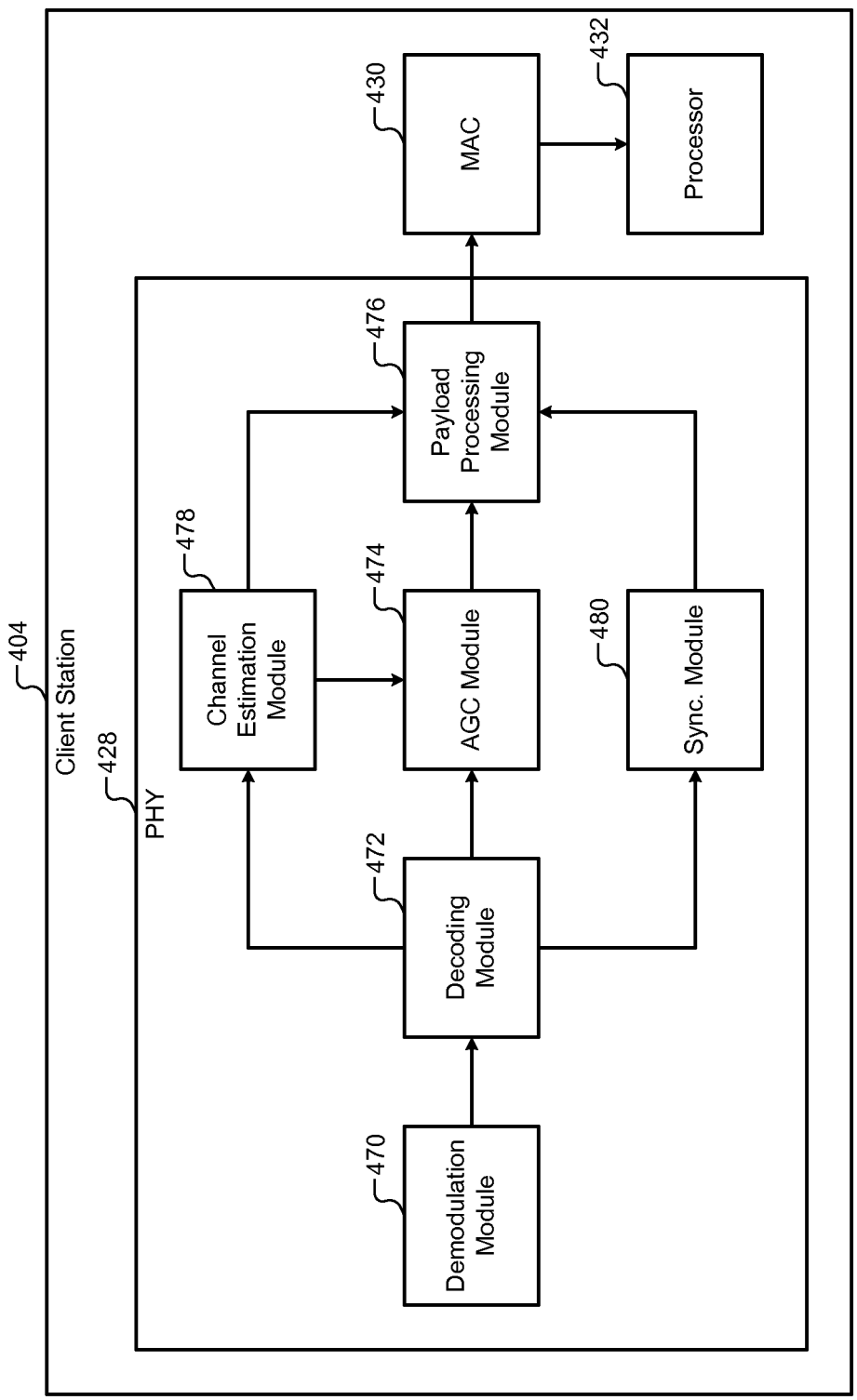
FIG. 6 is a functional block diagram of a client station.

Referring now to FIG. 6, one of the client stations 404 is shown in detail. The PHY 428 includes a demodulation module 470, a decoding module 472, an automatic gain control (AGC) module 474, a payload processing module 476, a channel estimation module 478, and a synchronization module 480. The demodulation module 470 demodulates a packet received by the PHY 428. Specifically, the demodulation module 470 initially demodulates a portion of a preamble of the packet to determine whether the packet is a SU packet or a MU packet as described below in detail. The decoding module 472 decodes the packet. Specifically, the decoding module 472 initially decodes a portion of the preamble of the packet to determine the duration of the packet and back off for the duration of the packet if necessary as described below in detail. The AGC module 474 adjusts a gain of components of the PHY 428.

The channel estimation module 476 generates channel estimates based on a portion of the preamble of the packet and provides feedback to the AGC module 474. The AGC module 474 controls the gain based on the channel estimates so that the payload processing module 476 can properly process the packet. The synchronization module 480 performs frequency synchronization based on a portion of the preamble of the packet so that the payload processing module 476 can properly process the packet.

Figure 7:
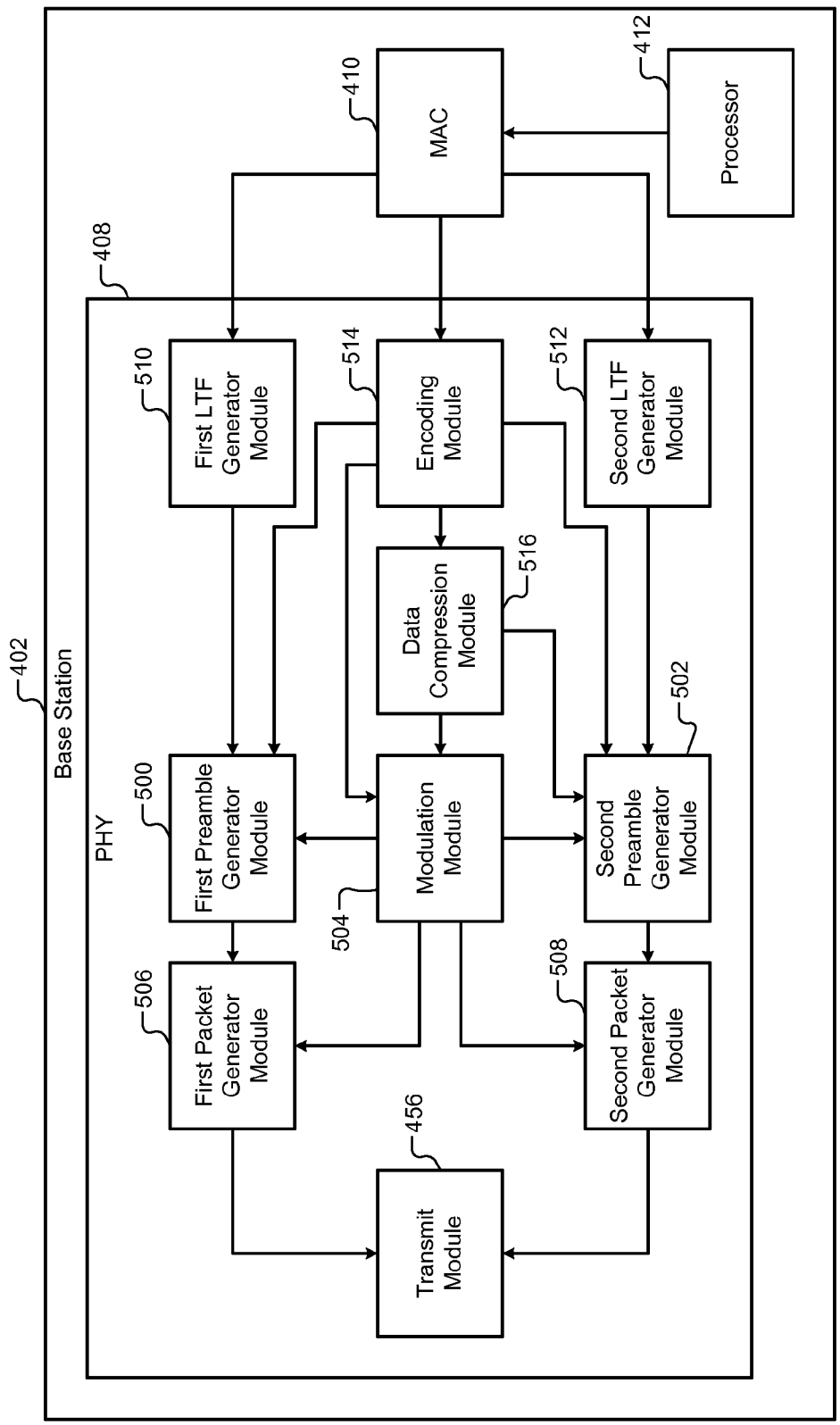
FIG. 7 is a functional block diagram of physical layer (PHY) of a base station.

Referring now to FIG. 7, the PHY 408 of the base station 402 is shown in greater detail. The PHY 408 includes a first preamble generator module 500, a second preamble generator module 502, a modulation module 504, a first packet generator module 506, a second packet generator module 508, a first long training field (LTF) generator module 510, a second LTF generator module 512, an encoding module 514, a data compression module 516, and the transmit module 456. The operation of each of these modules is described below with reference to additional figures.

Referring now to FIGS. 8A-8C, preamble designs according to the first option of the present disclosure are shown. In FIG. 8A, a single-user (SU) packet 600 including a SU preamble based on the Greenfield mode is shown. In FIG. 8B, a MU packet 650 including a MU preamble based on the mixed mode is shown. In FIG. 8C, a packet 690 including another MU preamble based on the mixed mode is shown.

In FIG. 8A, the SU preamble includes only one short training field (STF). Accordingly, the SU preamble does not include a legacy portion. The SU preamble includes the STF, the LTF1, a VHTSIGA1 field, a VHTSIGA2 field, and remaining LTFs. The SU preamble is followed by VHT data.

In FIG. 8B, the MU preamble includes a common portion and a MU portion. The common portion includes the STF, the LTF1, the VHTSIGA1 field, and the VHTSIGA2 field. The MU portion begins with a MU-STF following the VHTSIGA1 and VHTSIGA2 fields (collectively the VHTSIGA fields). The MU portion includes the MU-STF, MULTFs (i.e., VHTLTFs) that train all the spatial streams of all the users to which the packet is addressed, and an optional (hence shown dotted) VHTSIGB field. The MU preamble is followed by MU data.

The VHTSIGA fields in the SU and MU preambles can be decoded by both SU and MU receivers. When a SU receiver receives the MU packet 650, the SU receiver decodes the VHTSIGA fields, determines the duration of the MU packet 650, and backs off for the duration of the MU packet 650.

An SU/MU indication (i.e., whether a packet is a SU packet or a MU packet) is indicated in the VHTSIGA fields of the SU and MU preambles in various ways described below. Essentially, the SU/MU indication indicates to a receiver whether a MUSTF field is present in the preamble. Accordingly, an unintended receiver (e.g., a SU receiver that receives the MU packet 650) and an intended receiver (e.g., a SU receiver that receives the SU packet 600 or a MU receiver that receives the MU packet 650) can auto-detect whether a packet received is the SU packet 600 or the MU packet 650. The SU/MU indication can spoof the unintended receiver with accurate packet duration. An intended MU receiver can be ready to reset the gain of AGC based on the MUSTF.

In FIG. 8C, the common portion of the MU preamble may optionally include a legacy signal field LSIG (or VHTSIG0) prepended to the VHTSIG1 and VHTSIG2 fields. The VHTSIG0, VHTSIG1, and VHTSIG2 may be used to provide the SU/MU indication and to spoof the unintended receiver with accurate packet duration.

Figure 9A:
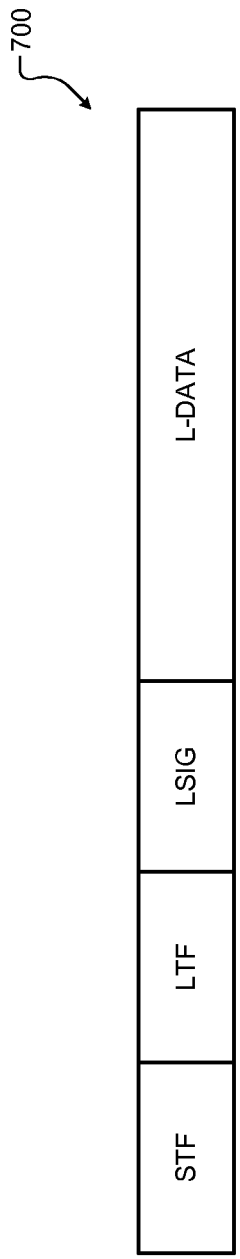
FIGS. 9A-9C illustrate different modulations used in preambles to differentiate a single-user packet from a multi-user packet.
Figure 9B:
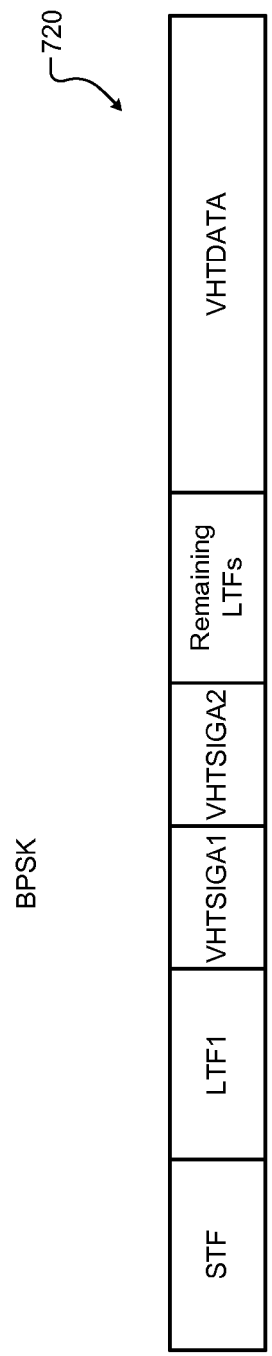
Figure 9C:
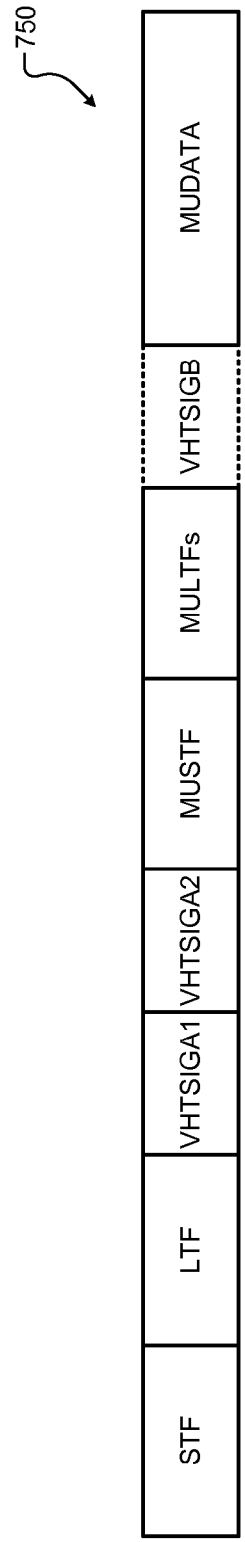

Referring now to FIGS. 9A-9C, the SU/MU indication can be provided by differently modulating the VHTSIGA fields. In FIG. 9A, a preamble of an 802.11a packet 700 is shown. In FIG. 9B, a single-user (SU) packet 720 including a SU preamble based on the Greenfield mode is shown. In FIG. 9C, a MU packet 750 including a MU preamble based on the mixed mode is shown.

The 802.11a preamble may be allowed in the 802.11ah and 802.11af WLANs in conjunction with the SU preamble based on the GF mode. The SU/MU detection is based on the VHTSIGA2 field. For example, referring also to FIG. 7, the modulation module 504 of the base station 402 may modulate the legacy signal field LSIG in the preamble of the 802.11a packet 700 using binary phase shift keying (BPSK) modulation. The modulation module 504 may modulate the VHTSIGA1 field and the VHTSIGA2 field in the SU preamble of the SU packet 720 using QBPSK modulation, where QBPSK is phase shifted relative to BPSK by 90 degrees. The modulation module 504 may modulate the VHTSIGA1 field and the VHTSIGA2 field in the common portion of the MU preamble of the MU packet 750 using QBPSK and BPSK modulation, respectively. Accordingly, the VHTSIGA2 field in the SU preamble of the SU packet 720 is modulated differently than the VHTSIGA2 field in the common portion of the MU preamble of the MU packet 750. The difference in modulation indicates to a receiver whether the packet received is the SU packet 720 or the MU packet 750.

Other modulation combinations used to modulate the VHTSIGA fields in the SU and MU preambles providing a difference in modulation of the kind described above are contemplated. For example, in MU preamble, VHTSIGA1-BPSK, VHTSIGA2-QBPSK (if there is no 11a preamble defined in 11ah/11af in parallel); VHTSIGA1-QBPSK, VHTSIGA2-QBPSK; VHTSIGA1-BPSK, VHTSIGA2-BPSK (if there is no 11a preamble defined in 11ah/11af in parallel); and VHTSIGA1-QBPSK, VHTSIGA2-BPSK. In SU preamble, at least one symbol in VHTSIGA is modulated differently from MU preamble.

In general, the VHTSIGA fields in the SU preamble and the MU preamble can be modulated in different ways so that the modulation of VHTSIGA1 and/or VHTSIGA2 field in the MU preamble is phase shifted (e.g., by 90 degrees) relative to the corresponding field in the SU preamble. For example, the VHTSIGA fields in the SU and MU preambles may be modulated in one of the following ways: (1) SU→VHTSIGA1-BPSK, VHTSIGA2-QBPSK; MU→VHTSIGA1-QBPSK, VHTSIGA2-(Q)BPSK; (2) SU→VHTSIGA1-BPSK, VHTSIGA2-QBPSK; MU→VHTSIGA1-BPSK, VHTSIGA2-BPSK; (3) SU→VHTSIGA1-QBPSK, VHTSIGA2-QBPSK; MU→VHTSIGA1-BPSK, VHTSIGA2-(Q)BPSK; (4) SU→VHTSIGA1-QBPSK, VHTSIGA2-QBPSK; MU→VHTSIGA1-QBPSK, VHTSIGA2-BPSK; (5) SU→VHTSIGA1-BPSK, VHTSIGA2-BPSK; MU→VHTSIGA1-QBPSK, VHTSIGA2-(Q)BPSK; (6) SU→VHTSIGA1-BPSK, VHTSIGA2-BPSK; MU→VHTSIGA1-BPSK, VHTSIGA2-QBPSK; (7) SU→VHTSIGA1-QBPSK, VHTSIGA2-BPSK; MU→VHTSIGA1-BPSK, VHTSIGA2-(Q)BPSK; and (8) SU→VHTSIGA1-QBPSK, VHTSIGA2-BPSK; MU→VHTSIGA1-QBPSK, VHTSIGA2-QBPSK. The modulation module 504 shown in FIG. 7 performs these modulations.

Whether a receiver is a SU receiver or a MU receiver, the receiver needs to detect whether a packet received is a SU packet or a MU packet before decoding the VHTSIGA fields so that the receiver knows whether a multi-user short training field (MUSTF) will follow the VHTSIGA fields (and whether a VHTSIGB field will possibly follow all the MULTFs (i.e., all the VHTLTFs)).

Referring now to FIGS. 10A-10C, if the 802.11a preamble (i.e., legacy packet 800 shown in FIG. 10A) is allowed in parallel and if the MU preamble includes three SIG symbols (i.e., also includes a LSIG field as shown in FIG. 10C), then the SU/MU indication is included in both the LSIG/VHTSIGA0 field and the VHTSIGA1 field of the MU packet 850. Accordingly, a receiver auto-detects whether a packet received is the SU packet 820 or the MU packet 850.

Figure 11A:
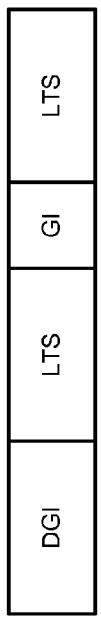
FIGS. 11A and 11B depict long training fields used in preambles to differentiate a single-user packet from a multi-user packet.
Figure 11B:
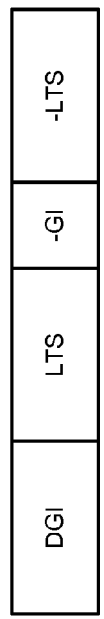

Referring now to FIGS. 11A and 11B, additional ways of providing the SU/MU indication are shown. These ways can be used instead of or in addition to the VHTSIGA modulations described above. For example, the long training field LTF1 may be used to provide the SU/MU indication. In FIG. 11A, the LTF1 field for the SU preamble is shown. In FIG. 11B, the LTF1 field for the MU preamble is shown.

In FIG. 11A, the LTF1 field of the SU preamble includes a double guard interval (GI), a first LTF symbol (LTS), a single GI, and a second LTS. In FIG. 11B, the LTF1 field of the MU preamble includes a double GI, a first LTS, a single GI, and a second LTS. The single GI and the second LTS in the LTF1 field of the MU preamble are phase shifted (e.g., by 180 degrees) relative to the single GI and the second LTS in the LTF1 field of the SU preamble. These phase differences allow a receiver to auto-detect whether a packet received is a SU packet or a MU packet.

The GI's and the LTS's in the LTF1 field of the SU preamble are aligned in time domain with the GI's and the LTS's in the LTF1 field of the MU preamble. Further, the cyclic prefix structure is maintained across the LTF1's in both the SU and the MU preambles to allow channel estimation and fine frequency synchronization. In FIG. 7, the first LTF generator module 510 generates the LTF1 of the SU preamble, and the second LTF generator module 512 generates the LTF1 of the MU preamble.

Figure 12A:
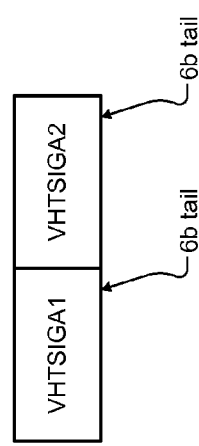
FIGS. 12A and 12B depict different bit allocations in preambles.
Figure 12B:
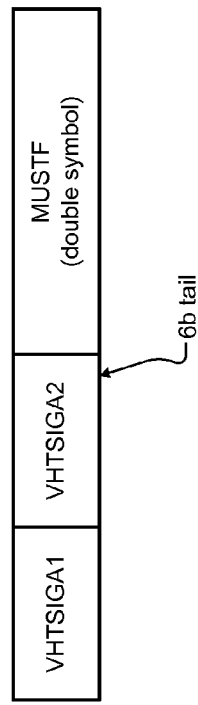

Referring now to FIGS. 12A and 12B, additional options for providing the SU/MU indication are shown. Again, these options can be used instead of or in addition to the VHTSIGA modulations and/or the LTF1 usage described above. In FIG. 12A, the SU/MU indication can be provided in the VHTSIGA1 field. In FIG. 12B, the SU/MU indication can be provided in the VHTSIGA2 field.

In FIG. 12A, the information needed to decode the VHTSIGA1 field may be included at the end of the VHTSIGA1 field so that a receiver can decode the VHTSIGA1 field before decoding the VHTSIGA2 field. For example, the information may include a 6-bit tail when the encoding module 514 (shown in FIG. 7) uses Block Convolutional code (BCC) to encode the VHTSIGA1 field. The SU/MU indication may be included in the VHTSIGA1 field in the form of a SU/MU bit or a group ID (GID) field. For example, the SU/MU bit may be a first bit of the VHTSIGA1 field (i.e., a first bit of the first VHTSIGA symbol). The GID field may include all zeros or all ones to indicate a SU packet and other values to indicate a MU packet. By decoding VHTSIGA1 before VHTSIGA2, the receiver knows whether a multi-user STF (MUSTF) and possibly a VHTSIGB field will follow. Accordingly, the receiver can be ready to reset the AGC gain when MUSTF is received.

In FIG. 12B, the information needed to decode the VHTSIGA1 and the VHTSIGA2 fields may be included at the end of the VHTSIGA2 field. For example, the encoder module 514 may include a single 6-bit tail at the end of the VHTSIGA2 field. Accordingly, the receiver will know whether a MUSTF and possibly a VHTSIGB field will follow only after decoding the VHTSIGA2 field. To allow the receiver sufficient time thereafter to reset the AGC gain based on the immediately following MUSTF, the MUSTF is a double symbol instead of a single symbol. Since the MUSTF has a duration of two OFDM symbols, a MU receiver has enough time to decode VHTSIGA, determine whether the packet received is a SU packet or a MU packet, and reset AGC gain based on the MUSTF if the packet is a MU packet. In FIG. 7, the second preamble generator module 502 generates the MUSTF having a double symbol.

Additional options for providing the SU/MU indication are as follows. The modulation module 504 shown in FIG. 7 may add extra information in unused constellation axis or tones of VHTSIGA in the MU packet. For example, according to a first option, the modulation module 504 modulates VHTSIGA in the SU packet by BPSK or QBPSK. That is, all signal energies of the constellation points are in I or Q rail. The modulation module 504 may use the same modulation for VHTSIGA in the MU packet, and additionally apply a weaker sequence in the other used axis for some or all the data/pilot tones. When a receiver receives a packet, the receiver can correlate the extra information and determine that a packet is a MU packet if the correlation is greater than or equal to a threshold and that the packet is a SU packet if the correlation is less than the threshold.

According to a second option, the modulation module 504 modulates the VHTSIGA in the SU packet and the MU packet as follows. In SU and MU packets, the VHTSIGA fields in the SU and MU preambles use the same set of data tones (subcarriers) to carry information such as the SU/MU indication. A plurality of guard tones surrounds the set of data tones on either side. In the SU packet (more specifically, in the SU preamble), the modulation module 504 modulates data tones of the VHTSIGA field but does not modulate the guard tones on either side of the data tones. In the MU packet (more specifically, in the MU preamble), however, the modulation module 504 modulates the plurality of guard tones on either side of the data tones. For example, the modulation module 504 applies some fixed constellation in two of the guard tones on each side of the band. A receiver can detect whether a received packet is a SU packet or a MU packet based on whether the extra information is present or absent in the unused constellation axis, or based on whether the guard tones are modulated or not modulated (i.e., unused).

Additional designs of the VHTSIGA subfields are described below. The designs relate to placement of information such as the 6-bit tail in the VHTSIGA subfields, bit allocations among the VHTSIGA subfields, MU data rate indications, and packet length/duration indication.

The VHTSIGA field is positioned in the SU and MU preambles at the positions of the 802.11n HTSIG field and/or the 802.11ac VHTSIGA field, with some fine tuning based on PHY features that are allowed in the 802.11ah/af standards. For example, the PHY features include number of spatial streams, PHY modes, and so on. The VHTSIGA field of the SU and MU preambles may have fewer bits relative to the 802.11n/ac standards. This is because the VHTSIGA field is less likely to include a LENGTH field as explained below. Further, the 802.11ah/af standards have fewer choices for data rates relative to the 802.11n/ac standards. Accordingly, the number of bits in the VHTSIGA field used to indicate data rates may be less than the 802.11n/ac standards.

The VHTSIGA field may have a single 6-bit tail at the end, or each VHTSIGA symbol has its own 6-bit tail, so that a receiver may decode the VHTSIGA field symbol-by-symbol to acquire some PHY information earlier (e.g., SU/MU indication to decide whether there will be MUSTF following VHTSIGA). The VHTSIGA field may nonetheless include any number of symbols necessary to carry all the PHY capabilities information bits. For example, the VHTSIGA field may include two symbols (not including LSIG/VHTSIGA0) or three symbols (including LSIG/VHTSIGA0). For example, the SU preamble may include a 2-symbol VHTSIGA (i.e., VHTSIG1 and VHTSIG2), and the MU preamble may include a 3-symbol common SIG field (i.e., LSIG/VHTSIG0, VHTSIG1, and VHTSIG2).

Figure 13A:
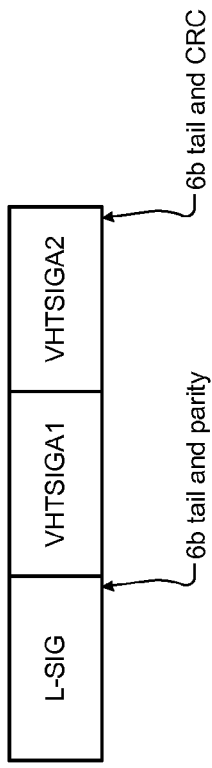
FIGS. 13A and 13D depict different bit allocations in preambles.
Figure 13B:
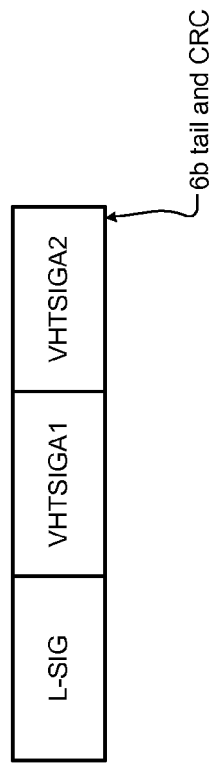
Figure 13C:
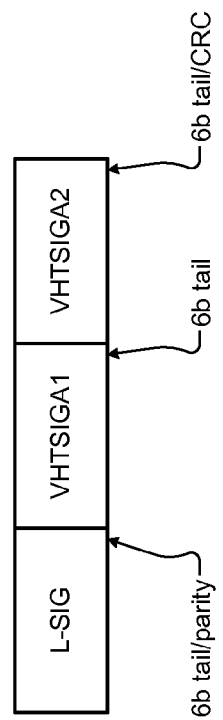
Figure 13D:
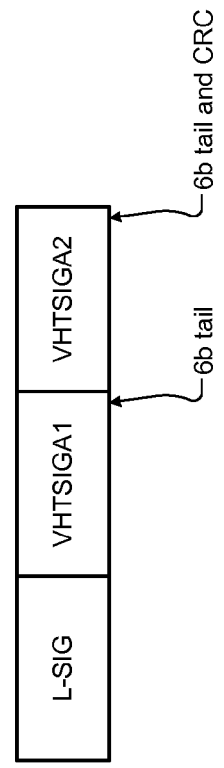

Referring now to FIGS. 13A-13D, various bit allocations are possible in the common SIG field (e.g., 2 or 3 symbols). The examples show 3 symbols. In FIG. 13A, LSIG/VHTSIGA0 ends with 6 tail bits and parity check so that a receiver can fully decode LSIG earlier than VHTSIGA. In FIG. 13B, all SIG symbols may be jointly encoded and jointly allocate bits among them. The jointly encoded SIG symbols end with a single 6-bit tail at the end of the VHTSIGA field. In FIG. 13C, each symbol in LSIG/VHTSIGA may end with a 6-bit tail so that a receiver may decode PHY information symbol-by-symbol for early SU/MU detection. Additional variations (e.g., see FIG. 13D) are possible. When the VHTSIGA field includes 2 symbols, a single 6-bit tail may be included at the end of the VHTSIGA field, or each symbol may have its own tail bits.

Subfield arrangements in VHTSIGA (2 symbols or 3 symbols) for indicating packet length or duration are now described. The LSIG/VHTSIGA field may include a LENGTH subfield to indicate a length of the packet (or of the payload) in number of bytes. Alternatively, the LSIG/VHTSIGA field may include a DURATION subfield to indicate a duration of the packet (or of the payload) in number of OFDM symbols. Actual packet duration can also be determined using the information in the LENGTH subfield in combination with the information in a MCS/Rate subfield.

If the MU preamble uses 3 symbols in the LSIG/VHTSIGA field, an L-LENGTH subfield and an L-Rate subfield can be used in the LSIG field to indicate the packet duration, and remaining multi-user PHY information bits (common to all users) are carried by the remaining 2 symbols of VHTSIGA.

Other bit allocations are contemplated. For example, the SU preamble may use the LENGTH subfield while the MU preamble may use the DURATION subfield. In multi-user cases, packet duration can be determined more accurately using the duration field than the length field since data lengths may differ for each user in multi-user cases. Nonetheless, if packet duration in multi-user cases is determined using the length subfield and data rates from the MCS/Rate subfield, the slowest of all the data rates should be used to ensure that the unintended receiver backs off until the end of the MU packet. If the VHTSIGB field is used and per-user MCS information is in the VHTSIGB field, then the "Duration field" is used in the VHTSIGA field for the MU preamble to indicate packet duration to each user.

Figure 14:
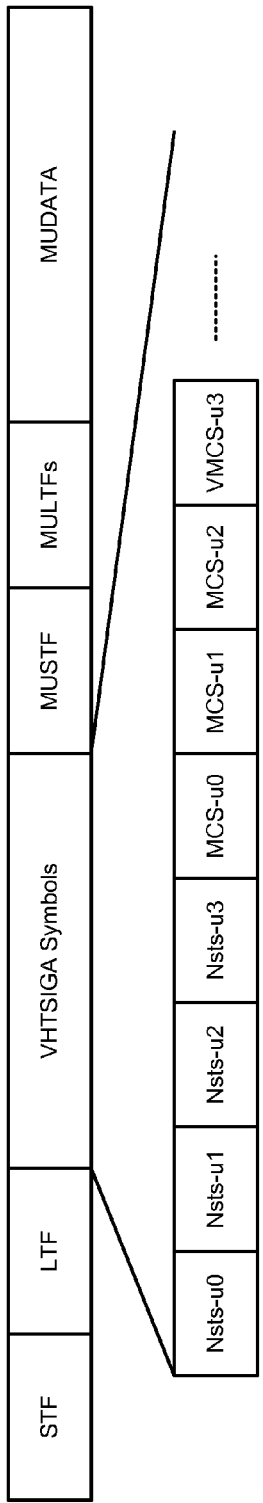
FIG. 14 depicts reallocation of bits from a first preamble field to a second preamble field in order to eliminate the second preamble field.

Referring now to FIG. 14, the per-user Nsts (i.e., number of space-time or spatial streams) and MCS information can be allocated within the VHTSIGA field so that the VHTSIGB field is not needed and therefore can be eliminated or made optional in the MU preamble. For example, each MU client may allow less Nsts and less data rates than 802.11ac. The LSIG/VHTSIGA field may have more bits freed due to, for example, less PHY modes, shorter possible length, only one single 6-bit tail at the end of VHTSIGA (no tail bits in LSIG), and so on. Accordingly, the per-user Nsts and MCS information can be moved from the VHTSIGB field and allocated within the VHTSIGA field in many different ways.

In a first option, the Nsts and MCS information for each user may be listed in different fields within the VHTSIGA field as shown. In the example shown, at most four users (u0 through u3) are allowed; Nsts=2 per user; and MCSs=MCS0-MCS7 per spatial stream per user. In a second option, the encoding module 514 shown in FIG. 7 may jointly encode Nsts+MCS of each user in a lookup table called "MCS" for each user, and the lookup tables may be listed for each user one-by-one within the VHTSIGA field. In a third option, the encoding module 514 may jointly encode Nsts+MCS of all the users, and the data compression module 516 shown in FIG. 7 may compress the encoded information in a lookup table in the VHTSIGA field.

The so called "MU preamble" may actually be used as a SU packet. For example, in a multiple-user group, there may be only one user that has data to transmit. Hence in the MU packet, only one user's data is transmitted while still using the MU preamble format. In other words, the "MU" cases described herein also include cases where a SU transmission is conducted by reusing MU preamble format. Accordingly, in general, throughout the present disclosure, SU preamble and MU preamble may be respectively referred to as "short preamble" and "long preamble". That is, SU preamble is shorted in length and duration than MU preamble.

Figure 15A:
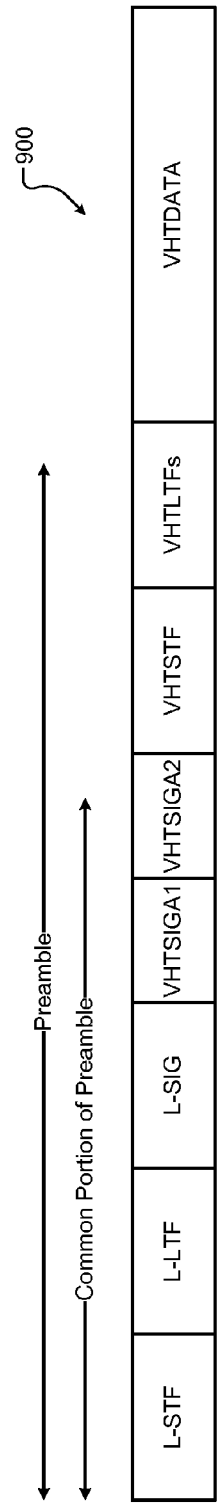
FIGS. 15A and 15B depict a second set of proposed preamble designs for IEEE 802.11ah and IEEE 802.11af standards.
Figure 15B:
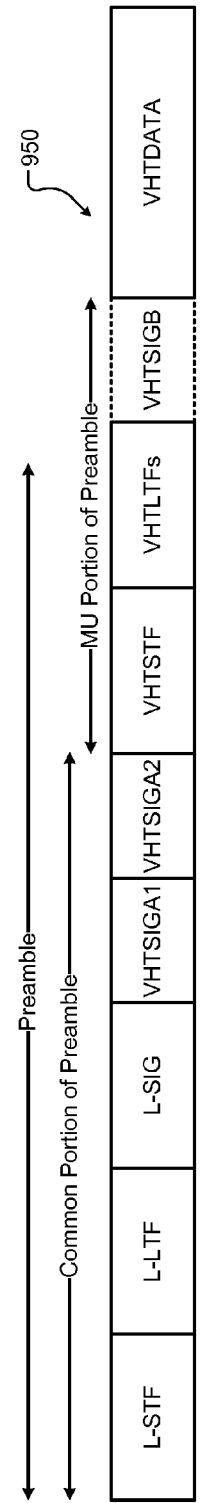

Referring now to FIGS. 15A and 15B, preamble designs according to the second option of the present disclosure are shown. In FIG. 15A, a single-user (SU) packet 900 including a SU preamble based on the mixed mode is shown. In FIG. 15B, a MU packet 950 including a MU preamble based on the mixed mode is shown.

In FIG. 15A, the SU preamble includes the legacy portion and a HT portion. The legacy portion includes the L-STF, the L-LTF, the L-SIG, and the VHTSIGA field including VHTSIGA1 and VHTSIGA2. The HT portion begins with VHTSTF following the VHTSIGA1 and VHTSIGA2 fields (collectively VHTSIGA fields). The HT portion includes the VHTSTF and the VHTLTFs. The SU preamble is followed by VHT data.

In FIG. 15B, the MU preamble includes a common portion and a MU portion. The common portion includes the L-STF, the L-LTF, the L-SIG, the VHTSIGA1, and the VHTSIGA2. The MU portion begins with VHTSTF following the VHTSIGA fields. The MU portion includes the VHTSTF and the VHTLTFs that train all the spatial streams of all the users to which the packet is addressed, and an optional (hence shown dotted) VHTSIGB field. The MU preamble is followed by VHT data.

The SU/MU indication is provided in the VHTSIGA or the LSIG field. The unintended receiver (e.g., a SU-only receiver) and the intended receiver can detect whether a packet received is the SU packet 900 or the MU packet 950 by decoding the LSIG field or the VHTSIGA field in the SU or the MU preamble.

Note that both the SU and MU preambles are mixed mode and have a second portion that starts at VHTSTF. In other words, the SU and MU preambles have a uniform format. Accordingly, the SU/MU indication need not be provided by rotating the VHTSIGA constellations.

Nonetheless, VHTSIGA1 and VHTSIGA2 can be modulated differently to provide the SU/MU indication. For example, VHTSIGA1-BPSK, VHTSIGA2-QBPSK; VHTSIGA1-QBPSK, VHTSIGA2-QBPSK; VHTSIGA1-BPSK, VHTSIGA2-BPSK (if there is no 802.11a preamble defined in 802.11ah/11af in parallel); or VHTSIGA1-QBPSK, VHTSIGA2-BPSK.

Additional designs of the VHTSIGA subfields for the preamble designs according to the second option are similar to those described above with reference to the preamble designs according to the first option and are therefore not repeated. The discussions related to VHTSIGA in the description of the preamble designs according to the first option also apply to the LSIG field in the preamble designs according to the second option and are therefore not repeated.

Regardless of whether the preamble designs according to the first option or the second option are used, the base station 402 shown in FIG. 7 and the client station 404 shown in FIG. 6 operate as follows. The first preamble generator module 500 generates a first preamble for a first packet. The first packet is a single-user packet. The first preamble includes (i) a first short training field, (ii) a first long training field, (iii) a first signal field, and (iv) a second signal field. The second preamble generator module 502 generates a second preamble for a second packet. The second preamble is longer than the first preamble. The second packet is a multi-user packet. The second preamble includes (i) a second short training field, (ii) a second long training field, (iii) a third signal field, and (iv) a fourth signal field. In one implementation, the modulation module 504 modulates at least one of (i) the first signal field and (ii) the second signal field of the first preamble differently than at least one of (i) the third signal field and (ii) the fourth signal field of the second preamble.

In response to receiving a packet transmitted via a sub-1 GHz channel in accordance with 802.11ah or 802.11af standards set forth by the Institute of Electrical and Electronics Engineers, a difference in modulation between (i) the first signal field and the third signal field or (ii) the second signal field and the fourth signal field allows a receiver to determine whether the packet received is the first packet or the second packet. Additionally, in response to the receiver being capable of processing the first packet and not the second packet, and in response to the receiver receiving the second packet, at least one of the third signal field and the fourth signal field of the second preamble allow the receiver to (i) determine a duration of the second packet and (ii) not access the sub-1 GHz channel for the duration of the second packet.

For example only, the modulation module 504 modulates (i) the first signal field and the second signal field of the first preamble and (ii) the third signal field of the second preamble using a first modulation, and modulates the fourth signal field of the second preamble using a second modulation.

The transmit module 456 transmits at least one of the first packet and the second packet from the base station 402 via a sub-1 GHz channel in accordance with 802.11ah or 802.11af standards set forth by the Institute of Electrical and Electronics Engineers. A receive module (e.g., PHY 428) determines whether a packet received by a client station (e.g., client station 404) is the first packet or the second packet based on a difference in modulation between (i) the first signal field and the third signal field or (ii) the second signal field and the fourth signal field.

The first packet generator module 506 generates the first packet. The first packet includes the first preamble, a first plurality of long training fields, and a first data field including data for a single user. The second packet generator module 508 generates the second packet. The second packet includes the second preamble, a multi-user short training field, a second plurality of multi-user long training fields, and a second data field including data for multiple users or for a single user transmitting data using the multi-user format.

In another implementation, the first long training field generator module 510 generates the first long training field of the first preamble. The first long training field includes a double guard band, followed by a first long training symbol, a first single guard band, and a second long training symbol. The second long training field generator module 512 generates the second long training field of the second preamble. The second long training field includes the double guard band, followed by the first long training symbol, a second single guard band, and a third long training symbol. The second single guard band is phase shifted relative to the first single guard band. The third long training symbol is phase shifted relative to the second long training symbol. A receive module (e.g., PHY 428) determines whether a packet received by a client station (e.g., client station 404) is the first packet or the second packet based on a difference in phase between (i) the first single guard band and the second single guard band and (ii) the second long training field and the third long training field.

In another implementation, the first preamble generator module 500 sets a bit in the first signal field to a first state. The second preamble generator module 502 sets the bit in the third signal field to a second state. The second state is opposite to the first state. The encoding module 514 encodes the first signal field, the second signal field, the third signal field, and the fourth signal field, includes data to decode the first signal field at the end of the first signal field, and includes data to decode the third signal field at the end of the third signal field. A receive module (e.g., PHY 428) decodes (i) the first signal field based on the data at the end of the first signal field or (ii) the third signal field based on the data at the end of the third signal field, and determines whether a packet received by a client station (e.g., client station 404) is the first packet or the second packet based on a state of the bit in the first signal field or the third signal field prior to decoding the second signal field or the fourth signal field.

In some implementations, the encoding module 514 encodes (i) the first signal field and the second signal field jointly, and (ii) the third signal field and the fourth signal field jointly; includes data to decode the first signal field and the second signal field at the end of the second signal field; and includes data to decode the third signal field and the fourth signal field at the end of the fourth signal field. The second packet generator module 508 generates the second packet. The second packet includes the second preamble, a multi-user short training field, a plurality of multi-user long training fields and a payload. The multi-user short training field has a length of a plurality of symbols. A receive module (e.g., PHY 428) decodes (i) the first signal field based on the data at the end of the second signal field or (ii) the third signal field based on the data at the end of the fourth signal field, and determines whether a packet received by a client station (e.g., client station 404) is the first packet or the second packet based on a state of the bit in the first signal field or the third signal field. In response to determining that the packet received is the second packet, the length of the multi-user short training field allows the receive module to reset a gain of an automatic gain control of the receive module prior to receiving the plurality of long training fields of the second packet.

In another implementation, in response to using binary phase shift keying modulation, the modulation module 504 adds information to an unused (i) constellation axis or (ii) tone, where the information is indicative of whether a packet is the first packet or the second packet.

In another implementation, at least one of the third signal field and the fourth signal field includes user-specific information for multiple users, and the second packet does not include an additional signal field following the second plurality of long training fields to carry the user-specific information. The user specific information includes one or more of (i) physical layer (PHY) modes, (ii) modulation and coding schemes, and (iii) number of streams per user for the multiple users. The second preamble generator module 502 stores user specific information for each of the multiple users in separate fields within the at least one of the third signal field and the fourth signal field. The encoder module 514 jointly encodes the user specific information for each of the multiple users. The second preamble generator module 502 stores the jointly encoded user specific information for each of the multiple users in the at least one of the third signal field and the fourth signal field. The data compression module 516 compresses the jointly encoded user specific information for all of the multiple users. The second preamble generator module 502 stores the compressed jointly encoded user specific information for all of the multiple users in the at least one of the third signal field and the fourth signal field.

In another implementation, the first preamble generator module 500 includes a length field in at least one of the first signal field and the second signal field, where the length field indicates a length of the first data field of the first packet. The second preamble generator module 502 includes a duration field in at least one of the third signal field and the fourth signal field, where the duration field indicates a duration of the second data field of the first packet. The length of the first data field is indicated in terms of a number of bytes in the first data field of the first packet. The duration of the second data field is indicated in terms of a number of symbols in the second data field of the second packet. In some implementations, the duration of the second data field of the second packet is indicated in terms of a number of bytes in the second data field. A receive module (e.g., PHY 428) determines the duration of the second data field of the second packet based on (i) the number of bytes in the at least one of the third signal field and the fourth signal field and (ii) a lowest of data rates used by the multiple users.

The clock generator module 450 (shown in FIG. 5) generates a first clock signal having a first frequency. The first frequency is less than a second clock frequency of a second clock signal generated in accordance with 802.11n or 802.11ac standards set forth by the Institute of Electrical and Electronics Engineers. For example only, the first frequency is one-tenth of the second frequency. The first preamble generator module 500 generates the first preamble based on the first clock signal. The second preamble generator module 502 generates the second preamble based on the first clock signal.

Figure 16:
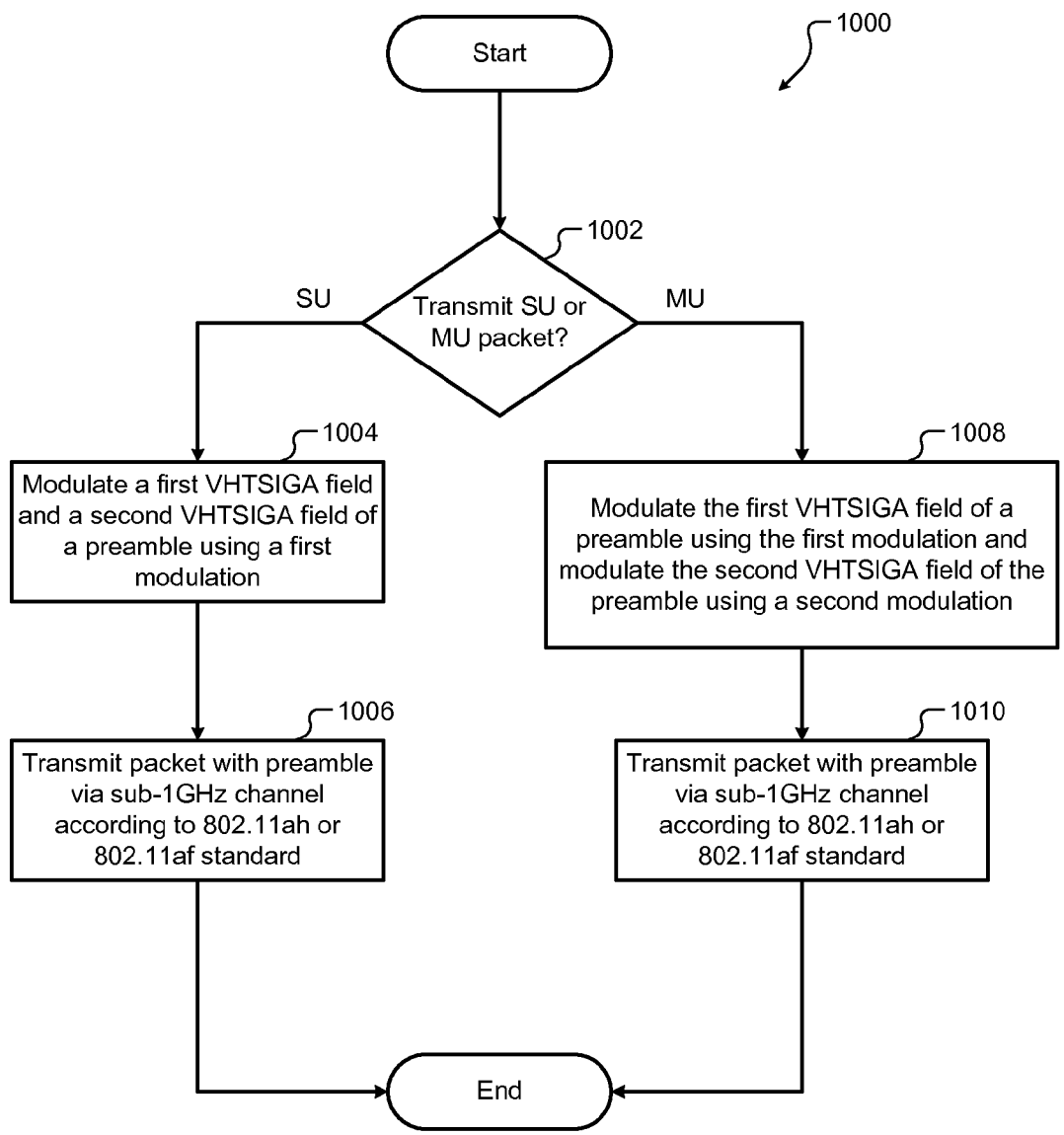
FIG. 16 is a flowchart of a method for generating preambles designed according to the present disclosure and transmitting packets including the preambles.

Referring now to FIG. 16, a method 1000 for generating preambles designed according to the present disclosure and transmitting packets including the preambles according to the present disclosure is shown. The method 1000 may be implemented by the base station 402. At 1002, control determines if a single-user (SU) packet or a multi-user (MU) packet is to be transmitted. At 1004, if a SU packet is to be transmitted, control modulates the first and second subfields (symbols) of the VHTSIGA field (e.g., VHTSIGA1 and VHTSIGA2) in the SU preamble using a first modulation (e.g., QBPSK). At 1006, control transmits the SU packet including the SU preamble via a sub-1 GHz channel according to the 802.11ah standard or the 802.11af standard. At 1008, if a MU packet is to be transmitted, control modulates the first subfield (symbol) of the VHTSIGA field (e.g., VHTSIGA1) in the MU preamble using the first modulation (e.g., QBPSK) and modulates the second subfield (symbol) of the VHTSIGA field (e.g., VHTSIGA2) in the MU preamble using a second modulation (e.g., BPSK). At 1010, control transmits the MU packet including the MU preamble via the sub-1 GHz channel according to the 802.11ah standard or the 802.11af standard.

Figure 17:
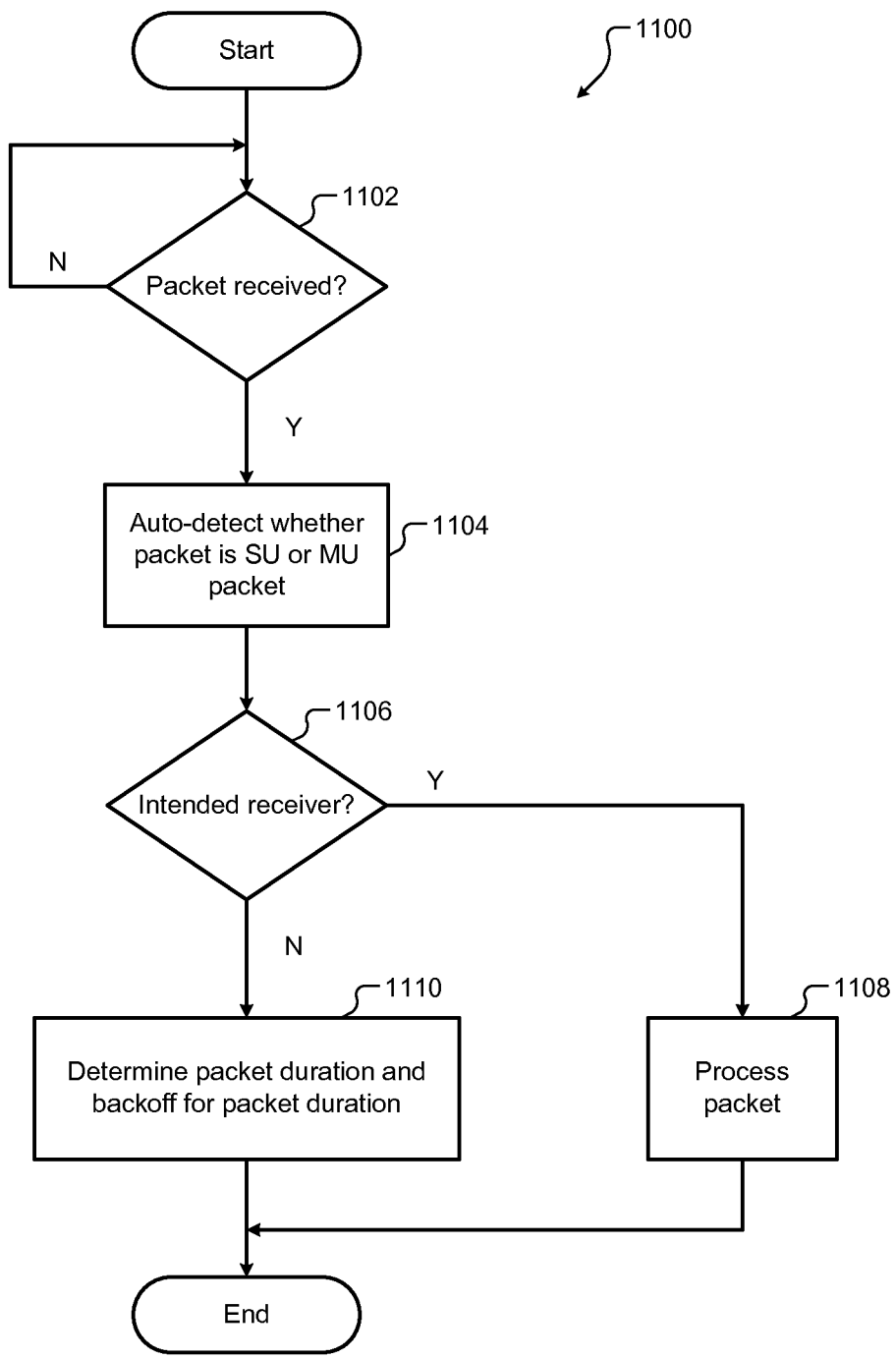
FIG. 17 is a flowchart of a method for auto-detecting whether a packet including a preamble designed according to the present disclosure is a single-user packet or a multi-user packet.

Referring now to FIG. 17, a method 1100 for auto-detecting whether a packet including a preamble designed according to the present disclosure is a SU packet or a MU packet is shown. At 1102, control determines if a packet transmitted via a sub-1 GHz channel according to the 802.11ah standard or the 802.11af standard is received. At 1104, control auto-detects, based on a portion of the preamble (e.g., based on the modulation of the second subfield (symbol) of the VHTSIGA field (e.g., VHTSIGA1) in the preamble) whether the packet is a SU packet or a MU packet. At 1106, control determines, based on the type of packet, whether the receiver is the intended or unintended recipient of the packet. At 1108, if the receiver is the intended recipient of the packet (e.g., if a SU receiver receives a SU packet or a MU receiver receives a MU packet), control processes the packet normally. At 1110, if the receiver is the unintended recipient of the packet (e.g., if a SU receiver receives a MU packet), control determines a duration of the packet based on a portion of the preamble and backs off for the duration of the packet.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
   a preamble generator module configured to
      generate a first preamble for a first packet, wherein the first packet is a single-user packet, and wherein the first preamble includes (i) a first short training field, (ii) a first long training field, and (iii) a first signal field, wherein the first signal field conforms to a Very High Throughput format specified in a wireless networking standard;
      generate a second preamble for a second packet, wherein the second preamble is longer than the first preamble, wherein the second packet is (i) a multi-user packet formatted as a multi-user packet or (ii) a single-user packet formatted as a multi-user packet, and wherein the second preamble includes (i) a second short training field, (ii) a second long training field, and (iii) a second signal field, wherein the second signal field conforms to the Very High Throughput format specified in the wireless networking standard, and wherein the second signal field is different than the first signal field; and
   a modulation module configured to modulate the first signal field of the first preamble for the first packet using a first modulation scheme and to modulate the second signal field of the second preamble for the second packet using a second modulation scheme, wherein the first modulation scheme is different than the second modulation scheme.

2. The system of claim 1, wherein in response to receiving a packet transmitted via a sub-1 GHz channel:
   a difference in modulation between (i) the first signal field and (ii) the second signal field allows a receiver to determine whether the packet received is the first packet or the second packet, and
   in response to the receiver being capable of processing the first packet and not the second packet, and in response to the receiver receiving the second packet, the second signal field of the second preamble allows the receiver to (i) determine a duration of the second packet and (ii) not access the sub-1 GHz channel for the duration of the second packet.

3. The system of claim 1, further comprising:
   a transmit module configured to transmit at least one of the first packet and the second packet from a base station via a sub-1 GHz channel; and
   a receive module configured to determine whether a packet received by a client station is the first packet or the second packet based on a difference in modulation between (i) the first signal field and (ii) the second signal field.

4. The system of claim 1, further comprising:
   a first packet generator module configured to generate the first packet, wherein the first packet includes the first preamble, a first plurality of long training fields, and a first data field including data for a single user; and
   a second packet generator module configured to generate the second packet, wherein the second packet includes the second preamble, a multi-user short training field, a second plurality of multi-user long training fields, and a second data field including data for multiple users or for a single user.

5. The system of claim 4, wherein:
   the second signal field includes user-specific information for multiple users, and
   the second packet does not include an additional signal field following the second plurality of long training fields to carry the user-specific information.

6. The system of claim 5, wherein the user specific information includes one or more of (i) physical layer (PHY) modes, (ii) modulation and coding schemes, and (iii) number of streams per user for the multiple users.

7. The system of claim 5, wherein the preamble generator module is configured to store user specific information for each of the multiple users in separate fields within the second signal field.

8. The system of claim 5, further comprising:
an encoder module configured to jointly encode the user specific information for each of the multiple users,
wherein the preamble generator module is configured to store the jointly encoded user specific information for each of the multiple users in the second signal field.

9. The system of claim 8, further comprising:
a data compression module configured to compress the jointly encoded user specific information for all of the multiple users,
wherein the preamble generator module is configured to store the compressed jointly encoded user specific information for all of the multiple users in the second signal field.

10. The system of claim 4, wherein the preamble generator module is configured to:
include a length field in the first signal field, wherein the length field indicates a length of the first data field of the first packet; and
include a duration field in at least one of the second field, wherein the duration field indicates a duration of the second data field of the first packet.

11. The system of claim 10, wherein:
the length of the first data field is indicated in terms of a number of bytes in the first data field of the first packet, and
the duration of the second data field is indicated in terms of a number of symbols in the second data field of the second packet.

12. The system of claim 10, wherein the duration of the second data field of the second packet is indicated in terms of a number of bytes in the second data field, the system further comprising:
a transmit module configured to transmit the second packet from a base station via a sub-1 GHz channel; and
a receive module configured to determine the duration of the second data field of the second packet based on (i) the number of bytes in the second signal field and (ii) a lowest of data rates used by the multiple users.

13. The system of claim 1, further comprising a first long training field generator module configured to generate the first long training field of the first preamble, wherein the first long training field includes a double guard band, followed by a first long training symbol, a first single guard band, and a second long training symbol.

14. The system of claim 13, further comprising:
a second long training field generator module configured to generate the second long training field of the second preamble,
wherein the second long training field includes the double guard band, followed by the first long training symbol, a second single guard band, and a third long training symbol,
wherein the second single guard band is phase shifted relative to the first single guard band; and
wherein the third long training symbol is phase shifted relative to the second long training symbol.

15. The system of claim 14, further comprising:
a transmit module configured to transmit at least one of the first packet and the second packet from a base station via a sub-1 GHz channel; and
a receive module configured to determine whether a packet received by a client station is the first packet or the second packet based on a difference in phase between (i) the first single guard band and the second single guard band and (ii) the second long training symbol and the third long training symbol.

16. The system of claim 1, wherein the preamble generator module is configured to:
set a bit in the first signal field to a first state, and
set the bit in the second signal field to a second state,
wherein the second state is different from the first state.

17. The system of claim 16, further comprising:
an encoding module configured to
encode the first signal field and the second signal field,
include data to decode the first signal field at the end of the first signal field, and
include data to decode the second signal field at the end of the second signal field.

18. The system of claim 17, further comprising:
a transmit module configured to transmit at least one of the first packet and the second packet from a base station via a sub-1 GHz channel; and
a receive module configured to
decode (i) the first signal field based on the data at the end of the first signal field or (ii) the second signal field based on the data at the end of the second signal field, and
determine whether a packet received by a client station is the first packet or the second packet based on a state of the bit in the first signal field or the second signal field prior to decoding a field subsequent to the first signal field or the second signal field.

19. The system of claim 1, wherein in response to using binary phase shift keying modulation, the modulation module is configured to add information to an unused (i) constellation axis or (ii) tone, wherein the information is indicative of whether a packet is the first packet or the second packet.

20. The system of claim 1, further comprising:
a clock generator module configured to generate a first clock signal having a first frequency,
wherein the first frequency is less than a second clock frequency of a second clock signal generated in accordance with 802.11n or 802.11ac standards set forth by Institute of Electrical and Electronics Engineers,
wherein the preamble generator module is configured to generate the first preamble and the second preamble based on the first clock signal.

21. A device comprising:
the system of claim 1; and
an antenna configured to transmit each of the first packet and the second packet from the device.

22. The device of claim 21, wherein the device comprises at least one of a base station or a client station.

* * * * *